US011958244B2

(12) United States Patent
Johnson et al.

(10) Patent No.: US 11,958,244 B2
(45) Date of Patent: Apr. 16, 2024

(54) MULTI-HEAD AUTOMATED FIBER PLACEMENT SYSTEM AND METHOD

(71) Applicant: The Boeing Company, Chicago, IL (US)

(72) Inventors: Brice A. Johnson, Federal Way, WA (US); Brandon Gorang, Seattle, WA (US)

( * ) Notice: Subject to any disclaimer, the term of this patent is extended or adjusted under 35 U.S.C. 154(b) by 237 days.

(21) Appl. No.: 17/457,387

(22) Filed: Dec. 2, 2021

(65) Prior Publication Data
US 2023/0173748 A1 Jun. 8, 2023

(51) Int. Cl.
*B29C 64/209* (2017.01)
*B29C 64/118* (2017.01)
*B29C 64/393* (2017.01)
*B29L 31/00* (2006.01)
*B33Y 10/00* (2015.01)
(Continued)

(52) U.S. Cl.
CPC .......... *B29C 64/209* (2017.08); *B29C 64/118* (2017.08); *B29C 64/393* (2017.08); *B33Y 10/00* (2014.12); *B33Y 30/00* (2014.12); *B33Y 50/02* (2014.12); *B29L 2031/7154* (2013.01)

(58) Field of Classification Search
CPC ......... B29C 70/16; B29C 70/38; B29C 70/32; B29C 70/545; B29C 70/386; B29C 64/209; B29C 64/118; B29C 64/393
See application file for complete search history.

(56) References Cited

U.S. PATENT DOCUMENTS 7,048,024 B2   5/2006   Clark
7,282,107 B2   10/2007  Johnson
(Continued)

FOREIGN PATENT DOCUMENTS

CA   2563663        11/2005
EP   2505343 A1 *  10/2012   ........... B29C 70/386
(Continued)

OTHER PUBLICATIONS

EPO, Extended Search Report for U.S. Appl. No. 22/197,809, dated May 24, 2023.
(Continued)

*Primary Examiner* — Nahida Sultana
*Assistant Examiner* — Mohamed K Ahmed Ali

(57) ABSTRACT

A manufacturing system includes a plurality of rails, a plurality of head manipulating mechanisms respectively coupled to the rails, and a plurality of automated fiber placement (AFP) heads respectively coupled to the head manipulating mechanisms. The rails are arranged around a barrel-shaped layup tool, and each rail is parallel to a tool axis. Each head manipulating mechanism moves along a rail. The head manipulating mechanisms position the AFP heads in circumferential relation to each other about a tool surface of the layup tool. A total quantity of AFP heads comprises the maximum number of AFP heads that can be circumferentially arranged in longitudinal alignment with each other on the layup tool without interfering with each other while applying layup material over the tool when the layup tool is stationary and during rotation about the tool axis, to thereby fabricate a green state layup having a barrel shape.

20 Claims, 26 Drawing Sheets

(51) Int. Cl.
    *B33Y 30/00*     (2015.01)
    *B33Y 50/02*     (2015.01)

(56) References Cited

U.S. PATENT DOCUMENTS

| | | |
|---|---|---|
| 7,867,352 B2 | 1/2011 | Johnson |
| 10,843,449 B2 | 11/2020 | Johnosn |
| 10,928,340 B2 | 2/2021 | Johnson |
| 2006/0156978 A1* | 7/2006 | Lipson ............... B33Y 50/00 |
| | | 438/3 |
| 2007/0187024 A1 | 8/2007 | Johnson |
| 2008/0156436 A1* | 7/2008 | Johnson ............... B29C 70/32 |
| | | 156/324 |
| 2016/0176123 A1 | 6/2016 | Pedigo |
| 2016/0341671 A1* | 11/2016 | Maass ............ G05B 19/41875 |
| 2020/0283171 A1* | 9/2020 | Holmes ............... G01N 25/72 |

FOREIGN PATENT DOCUMENTS

| | | |
|---|---|---|
| EP | 2505343 | 5/2023 |
| WO | WO2003035380 | 5/2003 |

OTHER PUBLICATIONS

Robotic Automation Systems, Inc., "6-Axis Robots—Articulated Robots," retrieved on Oct. 13, 2021, available at <https://www.roboticautomationsystems.com/6-axis-robots.html>.

* cited by examiner

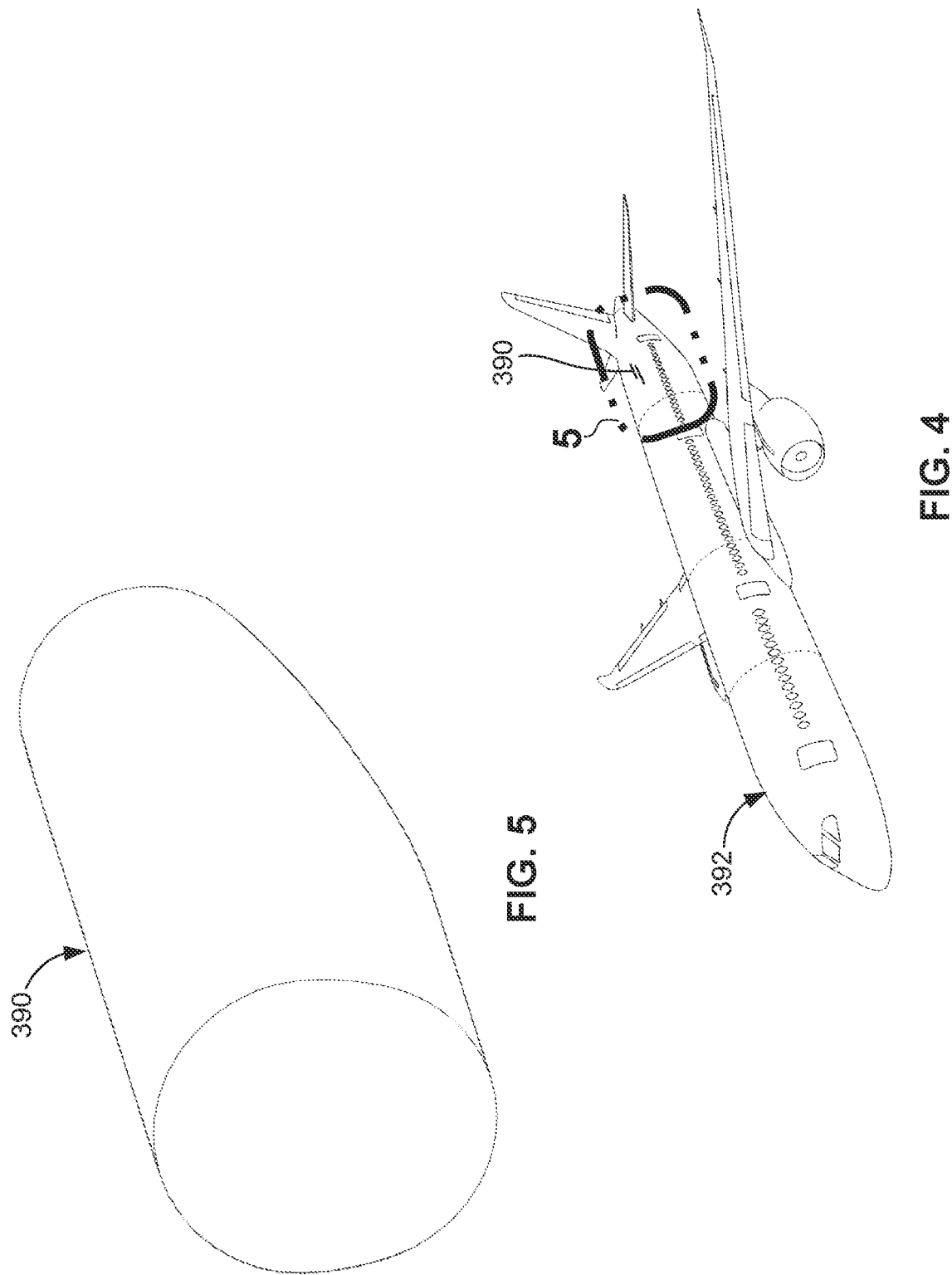

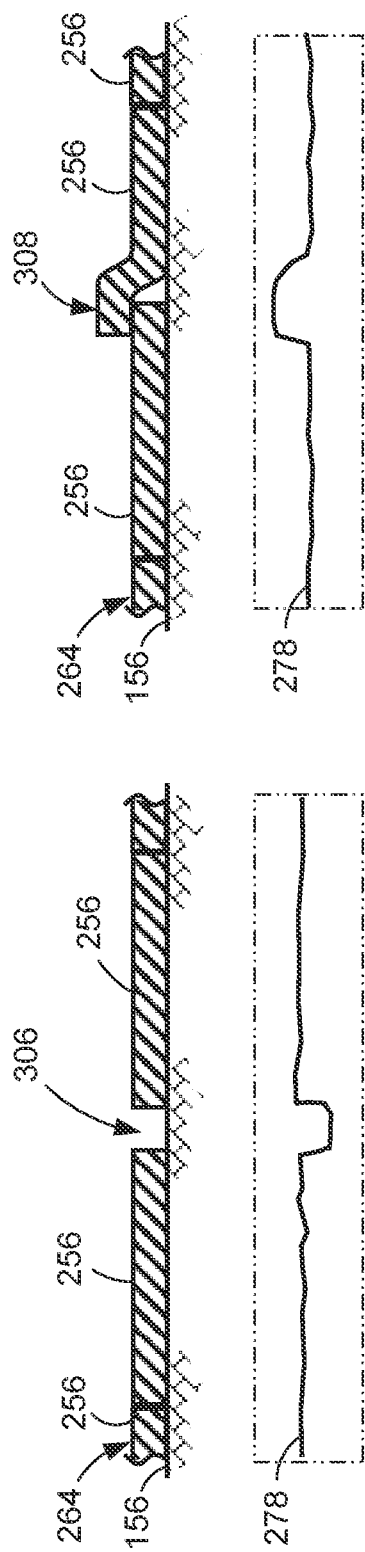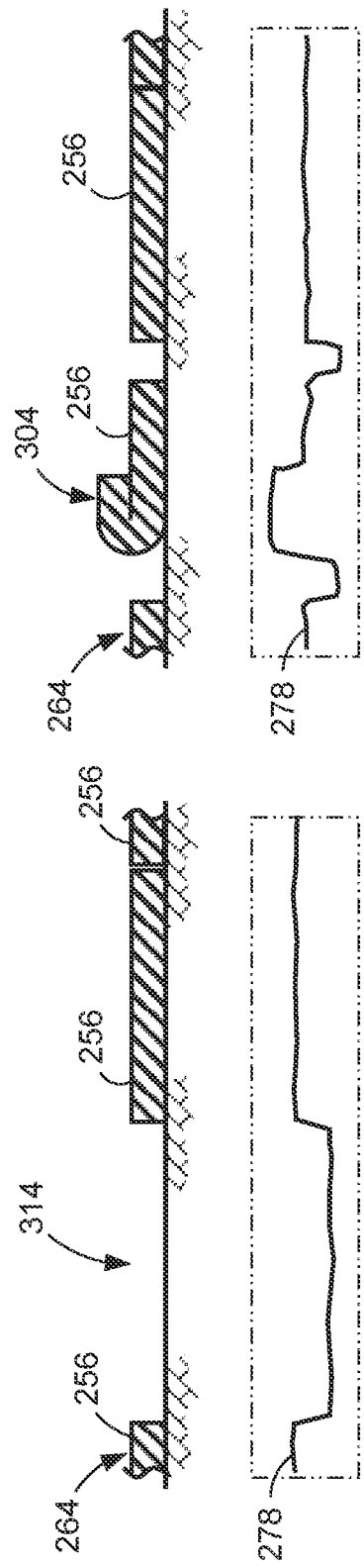

400

402 — MOVING A PLURALITY OF ARMS RESPECTIVELY ALONG A PLURALITY OF RAILS ARRANGED IN PARALLEL AND SPACED RELATION TO EACH OTHER ABOUT A BARREL-SHAPED TOOL HAVING A TOOL SURFACE AND A TOOL AXIS, EACH RAIL IS ORIENTED APPROXIMATELY PARALLEL TO THE TOOL AXIS, AND EACH RAIL SUPPORTS AN AUTOMATED FIBER PLACEMENT (AFP) HEAD

404 — APPLYING, USING THE AFP HEADS, COURSES OF COMPOSITE MATERIAL TO THE TOOL SURFACE WHEN THE TOOL IS STATIC AND DURING ROTATION ABOUT THE TOOL AXIS, WHILE MOVING THE ARMS ALONG THE RAILS

406 — MAINTAINING, USING THE HEAD MANIPULATING MECHANISMS, THE AFP HEADS IN CIRCUMFERENTIAL RELATION TO EACH OTHER ABOUT THE TOOL SURFACE WHILE THE PLURALITY OF AFP HEADS APPLY COURSES OF LAYUP MATERIAL OVER THE LAYUP TOOL, THE TOTAL QUANTITY OF AFP HEADS COMPRISES THE MAXIMUM NUMBER OF AFP HEADS THAT CAN BE CIRCUMFERENTIALLY ARRANGED IN LONGITUDINAL ALIGNMENT WITH EACH OTHER AT THE POINT OF MAXIMUM CIRCUMFERENCE ON THE LAYUP TOOL WITHOUT INTERFERING WITH EACH OTHER WHILE APPLYING THE COURSES OF LAYUP MATERIAL OVER THE LAYUP TOOL

FIG. 34

MULTI-HEAD AUTOMATED FIBER PLACEMENT SYSTEM AND METHOD

FIELD

The present disclosure relates generally to composites manufacturing and, more specifically, to a system and method for fabricating a composite structure having a barrel shape.

BACKGROUND

Composite materials are used in a wide variety of applications, such as aircraft production, due to their high specific strength, high specific stiffness, and high corrosion resistance. In addition, composite materials provide for increased service life for various structures of an aircraft. In this regard, composite materials are increasingly used to form the wings, the tail section components, and the fuselage of the aircraft.

The manufacturing of a composite fuselage may entail separately fabricating a plurality of composite fuselage barrel sections, and joining the fuselage barrel sections end-to-end. The manufacturing of each fuselage barrel section involves laying up multiple plies of composite material one-at-a-time over a layup tool to produce a green state layup, which is subsequently cured. The composite material is typically a fibrous material that is pre-impregnated with resin (e.g., prepreg). For example, the composite material may be epoxy-impregnated carbon fiber prepreg.

Automated fiber placement heads can increase the rate of manufacturing a layup. A fiber placement head dispenses a course of composite material as the fiber placement head is autonomously moved over the layup tool. The composite material is typically in the form of side-by-side tows. Multiple courses are sequentially laid up next to each other to form a composite ply. The process of laying up each composite ply is repeated, until all plies have been laid up in the desired ply stacking sequence.

Although fiber placement heads increase the rate at which composite material can be applied, conventional layup systems are still relatively slow, and do not meet the needs of future production programs. Furthermore, the layup tool is relatively expensive to build, such that it is desirable to minimize the total number of layup tools needed for laying up each unique composite part of a production program. The desire to limit the total number of layup tools dictates a need to minimize the total amount of time that each layup tool is in use during the laying up of a composite part.

As can be seen, there exists a need in the art for a system and method for producing composite layups at a high rate.

SUMMARY

The above-noted needs associated with producing composite layups are addressed by the present disclosure, which provides a manufacturing system comprising a plurality of rails arranged in parallel relation to each other around a barrel-shaped layup tool. Each rail is oriented approximately parallel to a tool axis of the layup tool. The manufacturing system also includes a plurality of head manipulating mechanisms, each coupled to a dedicated one of the rails, and each head manipulating mechanism is movable along a lengthwise direction of a corresponding rail. In addition, the manufacturing system includes a plurality of automated fiber placement (AFP) heads, each coupled to a dedicated one of the head manipulating mechanisms. The head manipulating mechanisms are configured to position the AFP heads in circumferential relation to each other about a tool surface of the layup tool. A total quantity of AFP heads comprises the maximum number of AFP heads that can be circumferentially arranged in longitudinal alignment with each other at a point of maximum circumference on the layup tool without interfering with each other while the AFP heads apply courses of layup material to the tool surface or to previously applied layup material when the layup tool is stationary and during rotation of the layup tool about the tool axis, to thereby fabricate a green state layup having a barrel shape.

Also disclosed is a method of manufacturing a barrel-shaped composite layup. The method comprises moving a plurality of head manipulating mechanisms respectively along a plurality of rails arranged in parallel relation around a barrel-shaped layup tool having a tool surface and a tool axis. Each rail is oriented approximately parallel to the tool axis, and each head manipulating mechanism supports an automated fiber placement (AFP) head. The method further includes applying, using the AFP heads, courses of layup material to the tool surface or to previously applied layup material when the layup tool is stationary and during rotation about the tool axis, to thereby fabricate a green state layup. The method also includes maintaining, using the head manipulating mechanisms, the AFP heads in circumferential relation to each other about the tool surface while the AFP heads apply courses of layup material over the layup tool. The total quantity of AFP heads comprises the maximum number of AFP heads that can be circumferentially arranged in longitudinal alignment with each other at a point of maximum circumference on the layup tool without interfering with each other while applying the courses of layup material over the layup tool.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 4 is a perspective view of an example of an aircraft having a fuselage comprised of composite fuselage barrel sections, each of which may be fabricated using the manufacturing system and method disclosed herein;

FIG. 5 is a magnified view of the portion of the aircraft identified by reference numeral 5 of FIG. 4, and illustrating an example of a fuselage barrel section fabricated using the manufacturing system disclosed herein;

FIG. 26 is a schematic illustration of a profile, as recorded by the profilometer, and representing a gap between adjacent tows, as shown in the schematic illustration of the tows located above the layup profile;

FIG. 27 is a schematic illustration of a profile representing an overlap of adjacent tows, as shown in the schematic illustration of the tows located above the layup profile;

FIG. 28 is a schematic illustration of a profile representing a missing tow, as shown in the schematic illustration of the tows located above the layup profile;

FIG. 29 is a schematic illustration of a profile representing a fold in a tow, as shown in the schematic illustration of the tows located above the layup profile;

FIG. 34 is a flowchart of operations included in a method of manufacturing a barrel-shaped composite layup;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
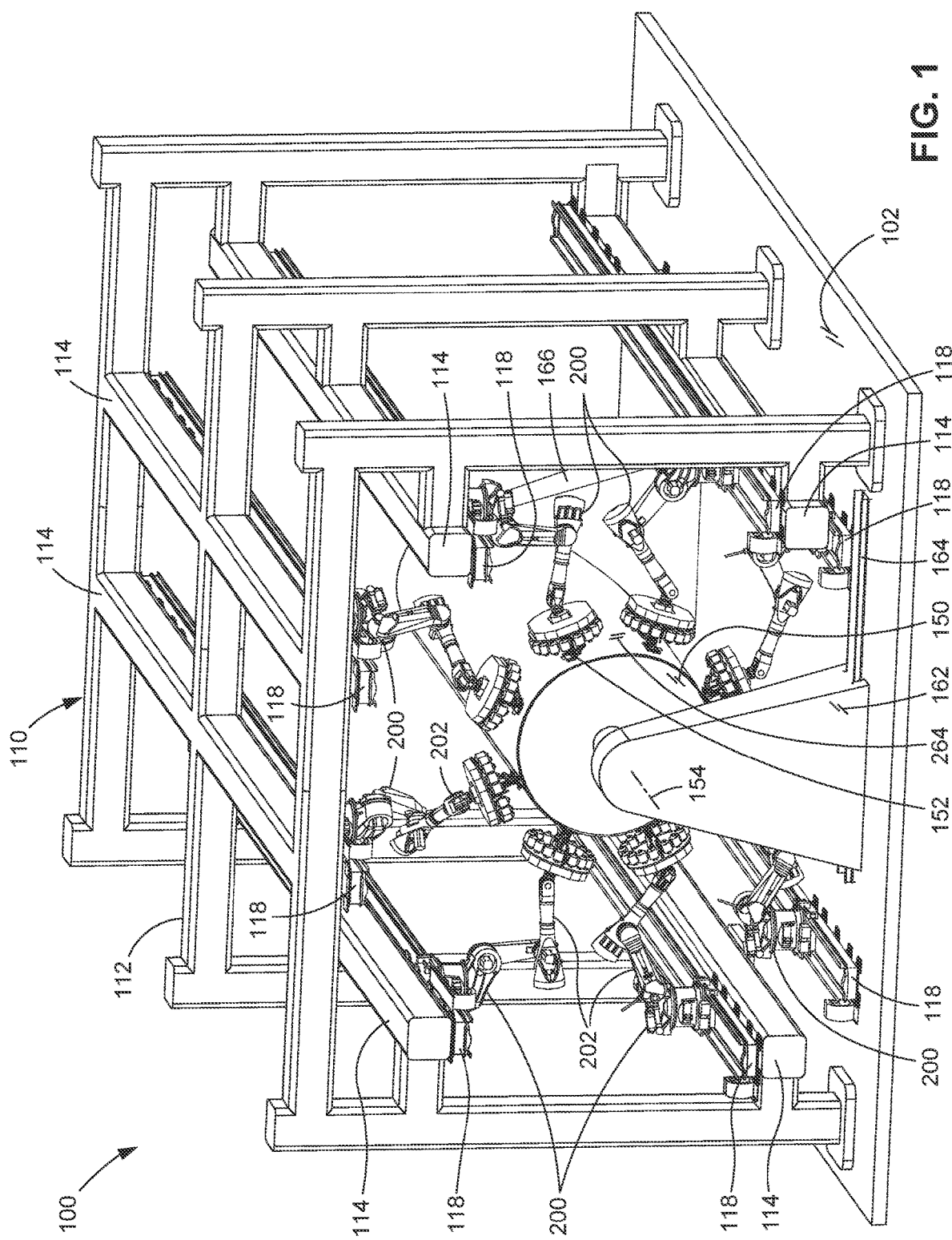
FIG. 1 is a perspective view of an example of a manufacturing system containing a plurality of automated fiber placement (AFP) heads each supported on a dedicated head manipulating mechanism, which are each coupled to a dedicated rail, each of which is mounted to a frame assembly, for fabricating a green state layup on a rotatable layup tool.
Figure 2:
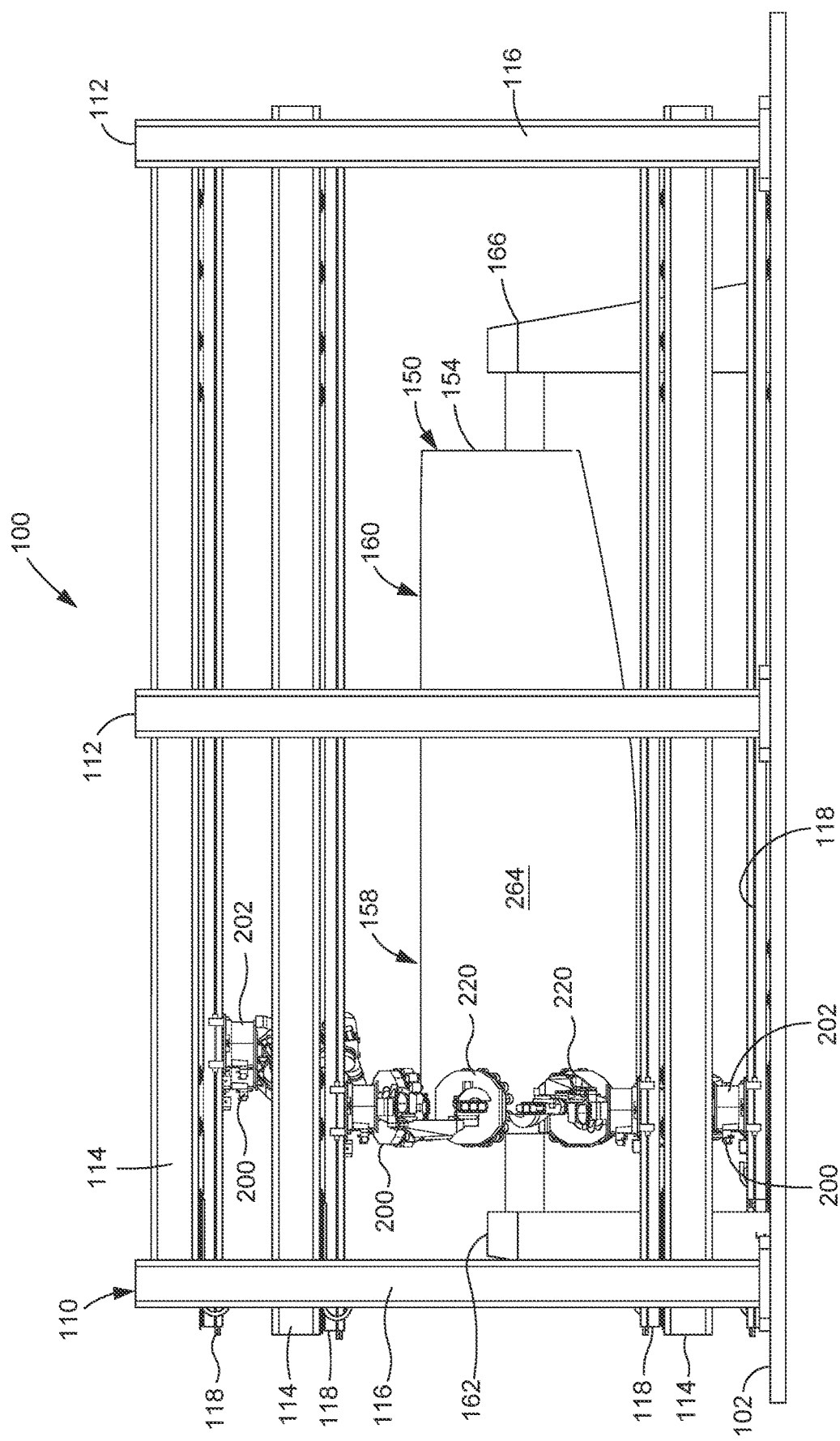
FIG. 2 is a side view of the manufacturing system of FIG. 1.
Figure 3:
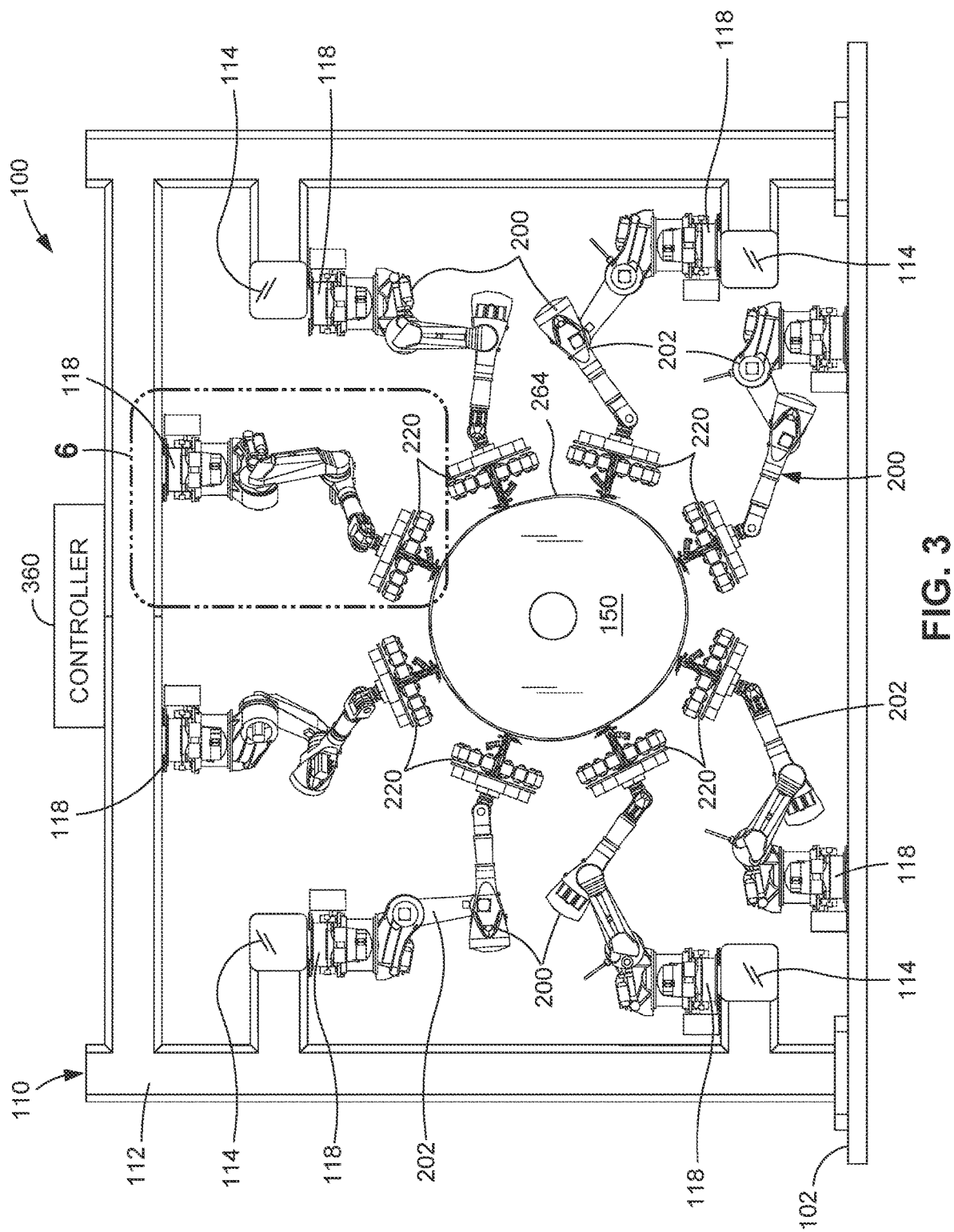
FIG. 3 is an end view of the manufacturing system of FIG. 1, illustrating the AFP heads circumferentially spaced about the layup tool.
Figure 22:
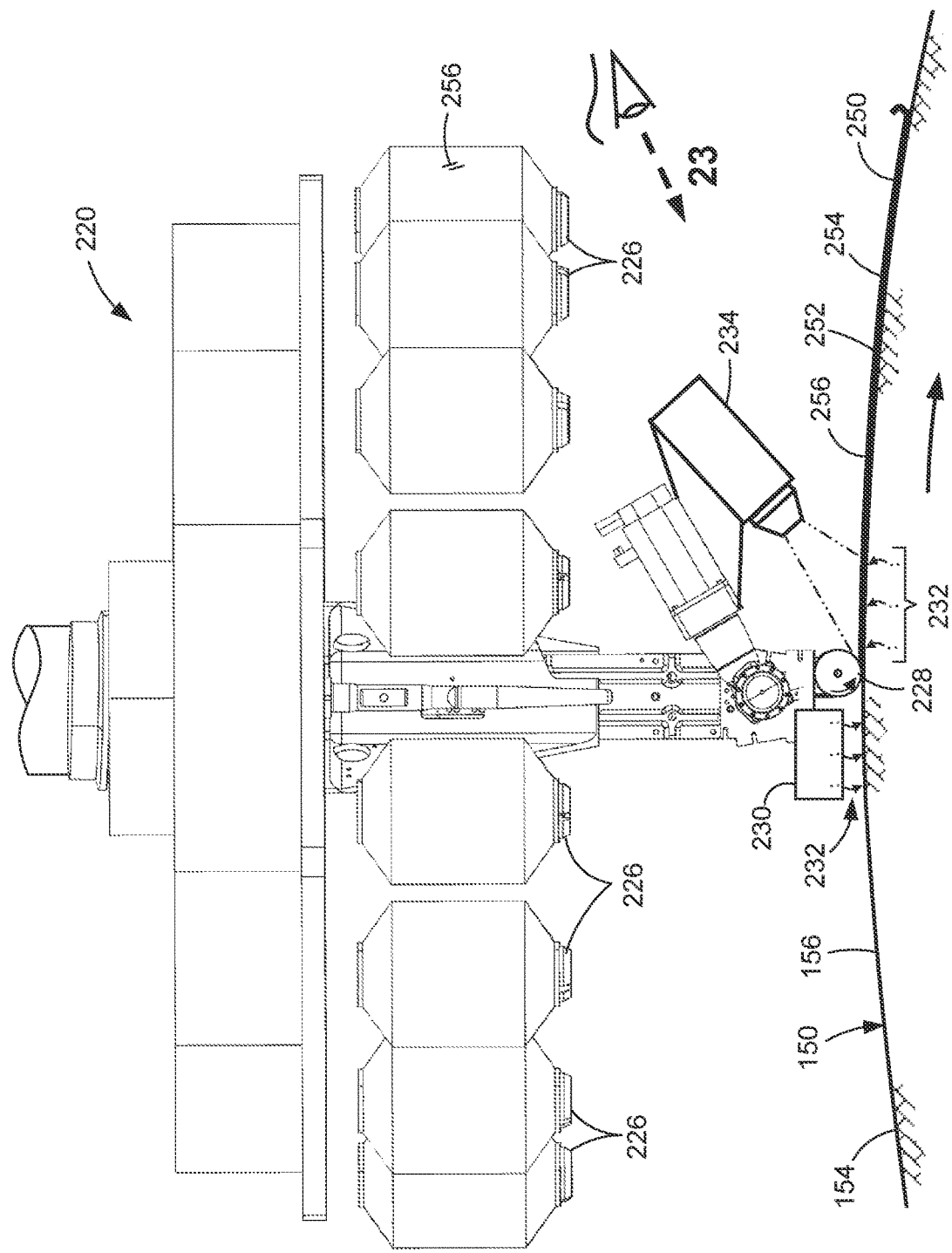
FIG. 22 is a side view of an example of an AFP head during the application of a course of layup material onto the tool surface, and illustrating a tow sensor mounted to the AFP head and capturing layup data of the layup material downstream of a compaction roller for compacting the layup material onto the tool surface, which is heated by a heating device located upstream of the compaction roller.

Referring now to the drawings which illustrate various examples of the disclosure, shown in FIGS. 1-3 is an example of a manufacturing system 100 for fabricating a one-piece, barrel-shaped composite layup, referred to herein as a green state layup 264. The green state layup 264 is an uncured composite layup having one or more plies of composite material 254 (FIG. 22). FIGS. 1-3 show the manufacturing system 100 located in a manufacturing cell of a production facility. The manufacturing system 100 includes a layup tool 150 having a barrel shape. The layup tool 150 has a tool surface 154, and a tool axis 152 about which the layup tool 150 is fully rotational (i.e., 360 degrees) in opposite directions.

As described below, the layup tool 150 may include a constant section 160, where the cross-sectional width is substantially constant along a lengthwise section of the layup tool 150. The layup tool 150 also includes a tapered section 158, which is described as a section of the layup tool 150 where the cross-sectional width of the layup tool 150 decreases, or where the cross-sectional width of the layup tool 150 is smaller than a section of maximum cross-sectional width. In the example shown, the layup tool 150 is shaped and configured for laying up a fuselage barrel section 390 of an aircraft 392. However, the manufacturing system 100 may be implemented on layup tools 150 of any size, shape, or configuration, and is not limited to use on a layup tool 150 similar to that shown in the figures.

As shown in FIGS. 1-3, the layup tool 150 is supported by a head stock 162 and a tail stock 166, located respectively on opposite ends of the layup tool 150. The layup tool 150 is rotatable via one or more tool drive motors (not shown), which may be included with the head stock 162. The head stock 162 and the tail stock 166 are supported on a factory floor 102 of the manufacturing cell. The layup tool 150 is supported in a manner such that the tool axis 152 is approximately horizontal (e.g., +/−10 degrees).

In the example shown, the head stock 162 is movable along head stock tracks 164 which are mounted to or integrated into the factory floor 102, to enable the head stock 162 to be moved to the side to allow the layup tool 150 to be moved lengthwise into an out of the manufacturing system 100, after which the head stock 162 is moved back into position and the layup tool 150 is coupled to the head stock 162 and the tail stock 166. The tail stock 166 may optionally include a track system (not shown) to facilitate movement of the layup tool 150 into and out of the tail stock 166 end of the manufacturing system 100.

Referring still to FIGS. 1-3, the manufacturing system 100 includes a plurality of rails 118 arranged in parallel relation to each other around the layup tool 150. Each rail 118 is linear (e.g., straight) and is oriented approximately parallel (e.g., within 10 degrees) to the tool axis 152. In addition, the rails 118 are shown oriented parallel to each other. The rails 118 are fixedly coupled to a frame assembly 110, which is shown supported on the factory floor 102, and which may be comprised of beam members 112 and posts 116 generally surrounding the layup tool 150. The frame assembly 110 includes horizontal beams 114 configured to provide relatively stiff or non-deflecting support for the rails 118.

The manufacturing system 100 also includes a plurality of multi-axis head manipulating mechanisms 200. Each head manipulating mechanism 200 supports an automated fiber placement (AFP) head 220, and each head manipulating mechanism 200 is configured to move along a dedicated rail 118. The head manipulating mechanisms 200 are controlled by one or more controllers 360. Each head manipulating mechanism 200 is configured to provide full range of motion of the AFP head 220 to which it is mounted. For example, each head manipulating mechanism 200 is configured to both translate and rotate the AFP head 220 about 3 mutually perpendicular axes.

As described in greater detail below, the head manipulating mechanisms 200 are shown as robotic arms 202 (e.g., FIG. 6), each having an arm base 204 coupled to a rail 118. In addition, the robotic arms 202 each include a plurality of arm segments 206 interconnected by arm joints 208. However, the head manipulating mechanisms 200 may be provided in alternative configurations, and are not limited to robotic arms 202. In this regard, the head manipulating mechanisms 200 may be provided in any configuration that allows for multi-axis movement of the AFP heads 220 with full range of motion, to maintain each of the AFP heads 220 approximately aligned with (i.e., locally normal) to the tool surface 154.

As mentioned above, the manufacturing system 100 includes a plurality of AFP heads 220, each supported by a head manipulating mechanism 200. Each AFP head 220 is configured to apply layup material 252 (FIGS. 22-23) onto the tool surface 154 (FIG. 22) or onto previously applied layup material 252 as the AFP head 220 moves relative to the tool surface 154 along a preprogrammed tool path. The AFP heads 220 are configured to apply layup material 252 to the tool when the layup tool 150 is stationary (i.e., non-rotated) and when the layup tool 150 is rotating about the tool axis 152.

Figure 23:
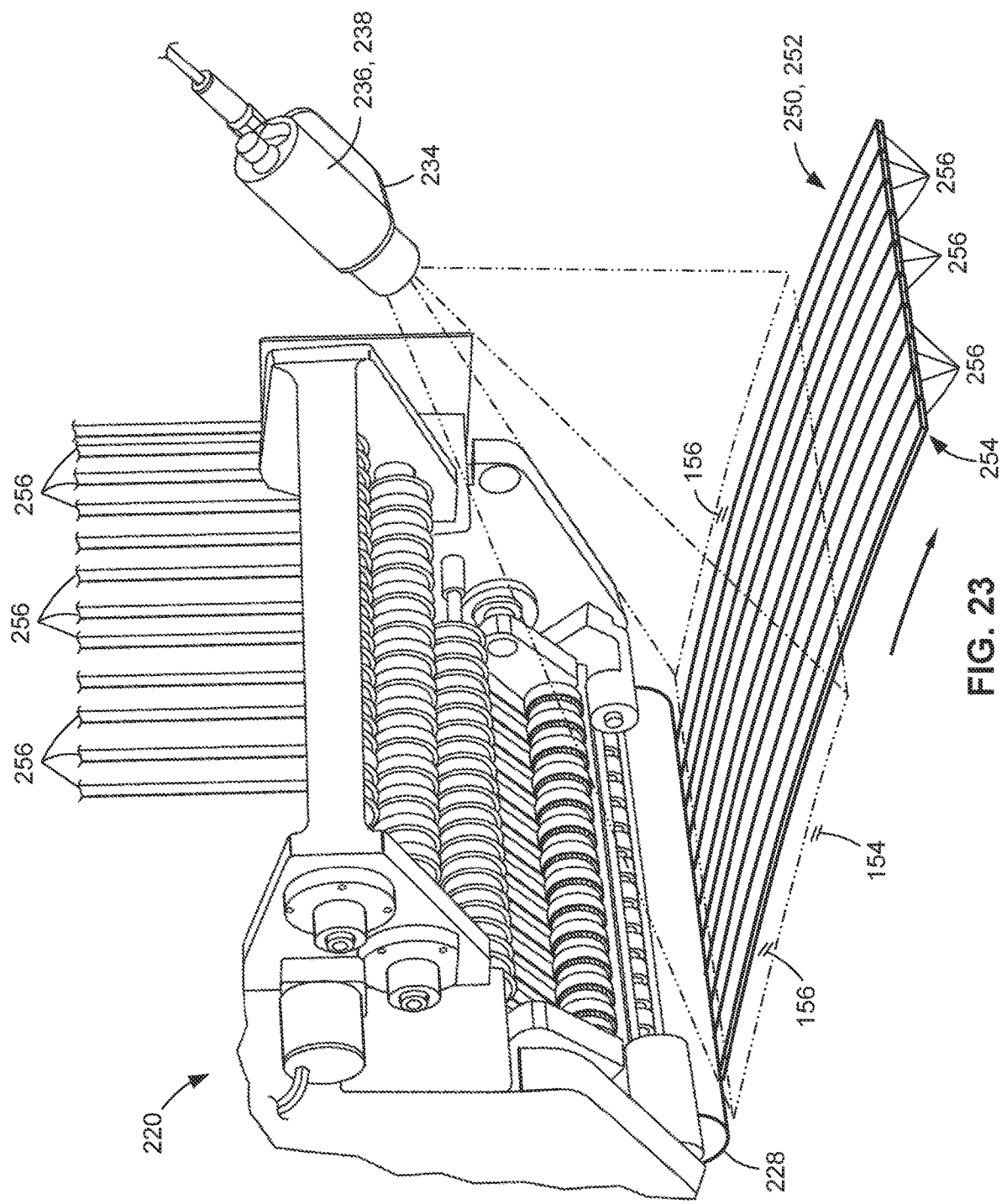
FIG. 23 is a perspective view taken along line 23 of FIG. 22, and illustrating the tow sensor configured as an infrared camera, capturing a series of infrared images of side-by-side tows of composite material applied by the AFP head onto the tool surface.

Referring briefly to FIGS. 22-23, shown is an example of an AFP head 220 applying composite material 254 to a tool surface 154. The AFP head 220 has a plurality of material rolls 226, each containing a continuous winding of tows 256 of composite material 254. In one example, the composite material 254 is a prepreg comprised of unidirectional reinforcing fibers pre-impregnated with resin. The reinforcing fibers may be formed of any one of a variety of materials, such as plastic, glass, ceramic, carbon, metal, or any combination thereof. The resin is a thermosetting resin or a thermoplastic resin, and may be formed of any one of a variety of organic or inorganic materials.

The AFP head 220 collects the tows 256 from the material rolls 226, collimates the tows 256 into side-by-side relation, and places the side-by-side tows 256 as a course 250 onto the tool surface 154 or onto previously applied courses 250 of tows 256. The AFP head 220 has a compaction device or compaction roller 228 for compacting the tows 256 onto the substrate 156 (e.g., the tool surface 154 or previously applied tows 256). In addition, the AFP head 220 has a heating device 230 (e.g., an infrared heater) located upstream of the compaction roller 228 for heating the substrate 156 to increase the level of adhesion or tack between the tows 256 and the substrate 156. As described in greater detail below, heat 232 applied to the substrate 156 by the heating device 230 facilitates detection of anomalies 300 in the tows 256 during laydown, using a tow sensor 234 (e.g., an infrared camera) located on the downstream side of the compaction roller 228.

Each tow 256 has a relatively narrow width, which allows the tows 256 to conform to the local curvature or geometry of the layup tool 150. In one example, each AFP head 220 may be configured to lay up an 8-inch-wide band of ½-inch-wide tows 256 on a highly contoured layup tools 150. In another example, the AFP heads 220 may be configured to lay up a 16 inch-wide band of ½-inch tows 256 for relatively use with large diameter layup tools 150. However, the tows 256 may be provided in any width, such as ¼-inch width or other widths. In still other examples not shown, each AFP head 220 may be configured to lay up single-width composite tape having a width of 3 inches or more.

However, the AFP heads 220 are not limited to laying up composite material 254, and may be configured to dispense alternative types of layup material 252. For example, the AFP heads 220 may be configured to dispense metallic foil or metallic mesh (e.g., for electromagnetic effects protection) as one of the plies of a green state layup 264. In still further examples, the AFP heads 220 may be configured to dispense one or more processing layers, to facilitate the laying up or processing of the green state layup 264. Such processing layers may include a release film, a tackifier film, a breather layer, a bleeder layer, peel ply, or any one of a variety of other layers, films, or adhesives that may be laid up prior to or during the fabrication of the green state layup 264. Such processing layers may facilitate the layup, debulking, forming (i.e., into a desired shape), and/or curing of the green state layup 264.

Figure 8:
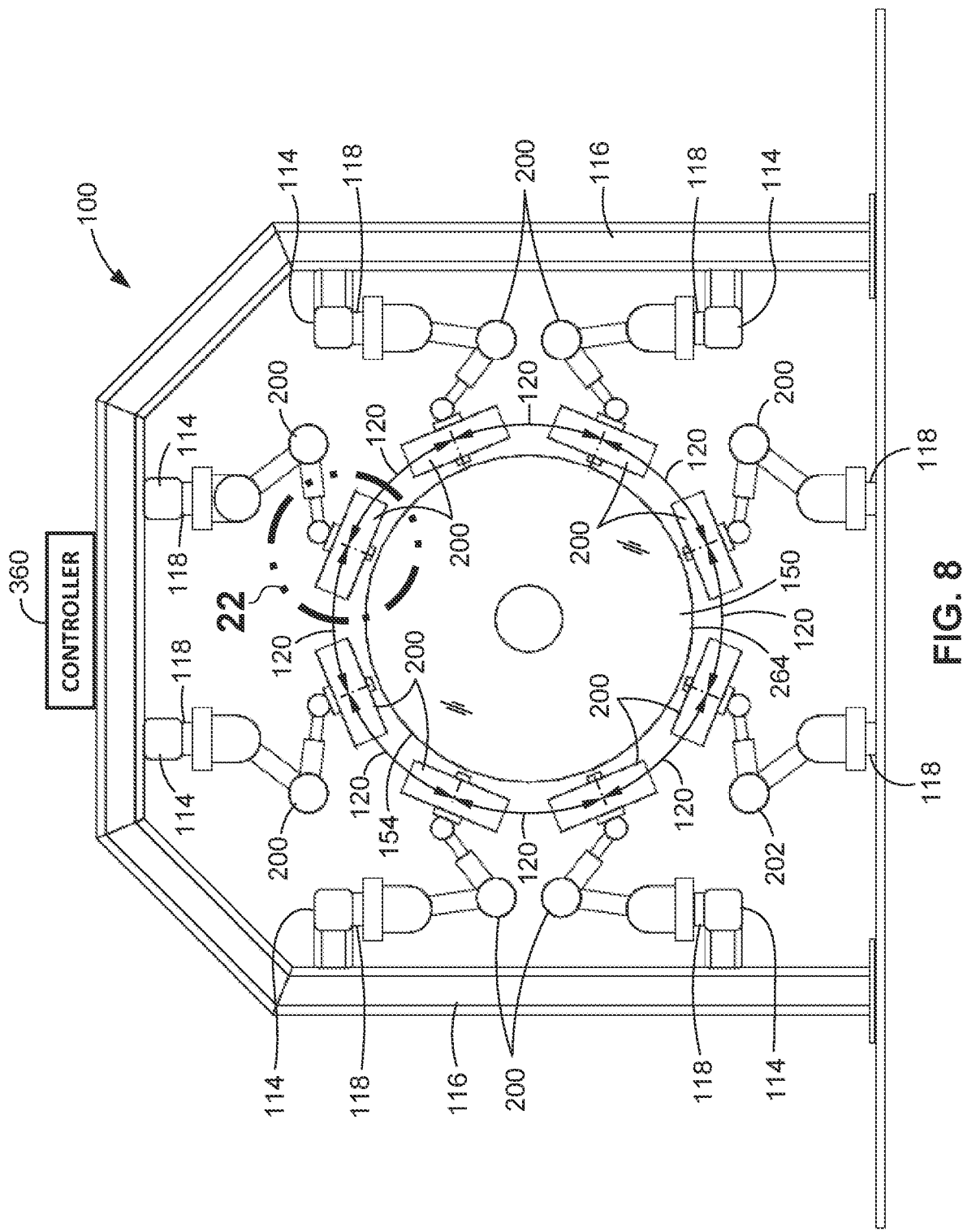
FIG. 8 is a front view of the manufacturing system of FIG. 7.
Figure 16:
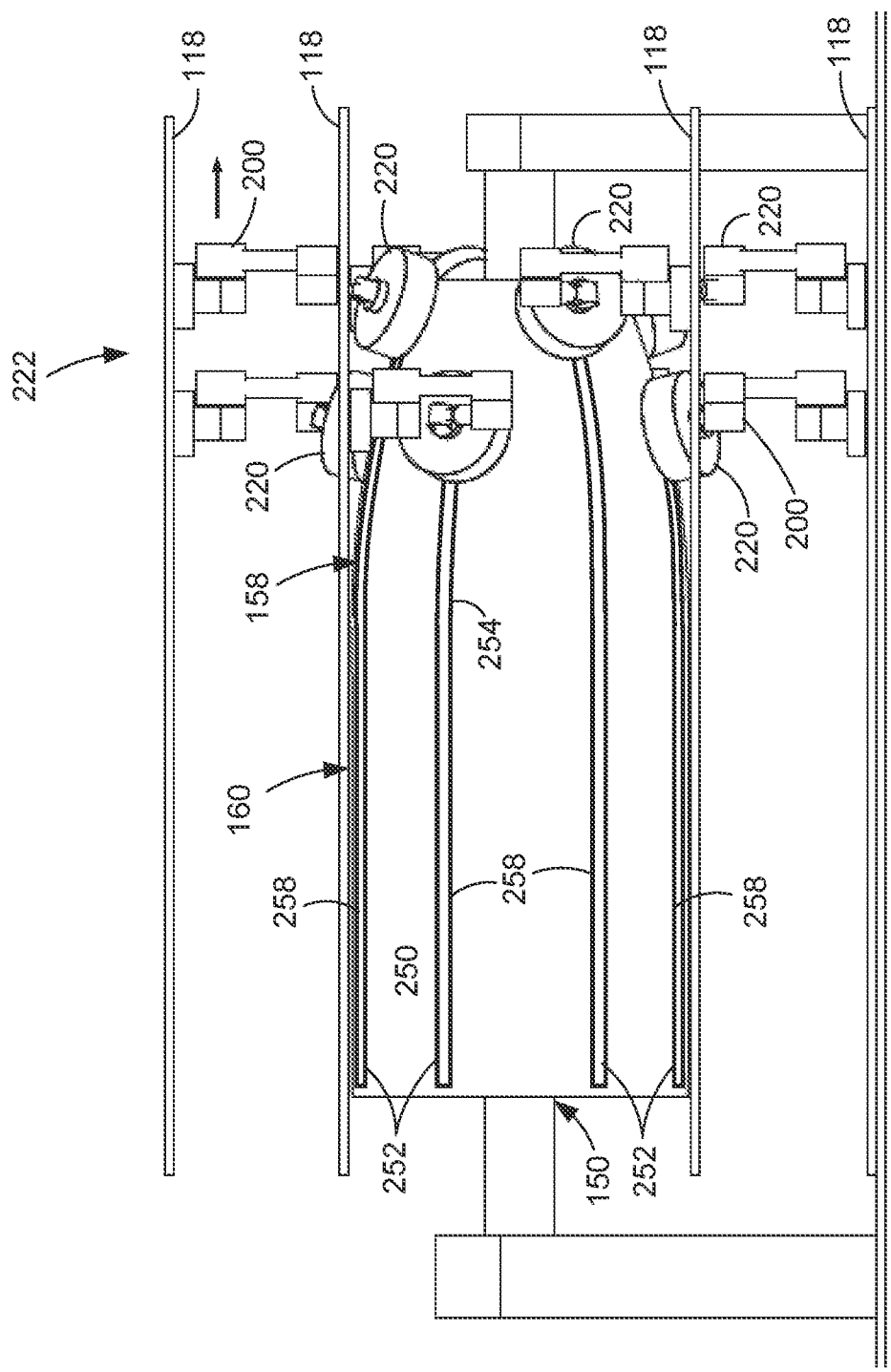
FIG. 16 is a side view of the manufacturing system of FIG. 15 and illustrating the head manipulating mechanisms adjusting the head velocity of alternate AFP heads in a manner to longitudinally stagger the AFP heads relative to each other to avoid interference between the AFP heads during movement along a tapered section of the layup tool.
Figure 20:
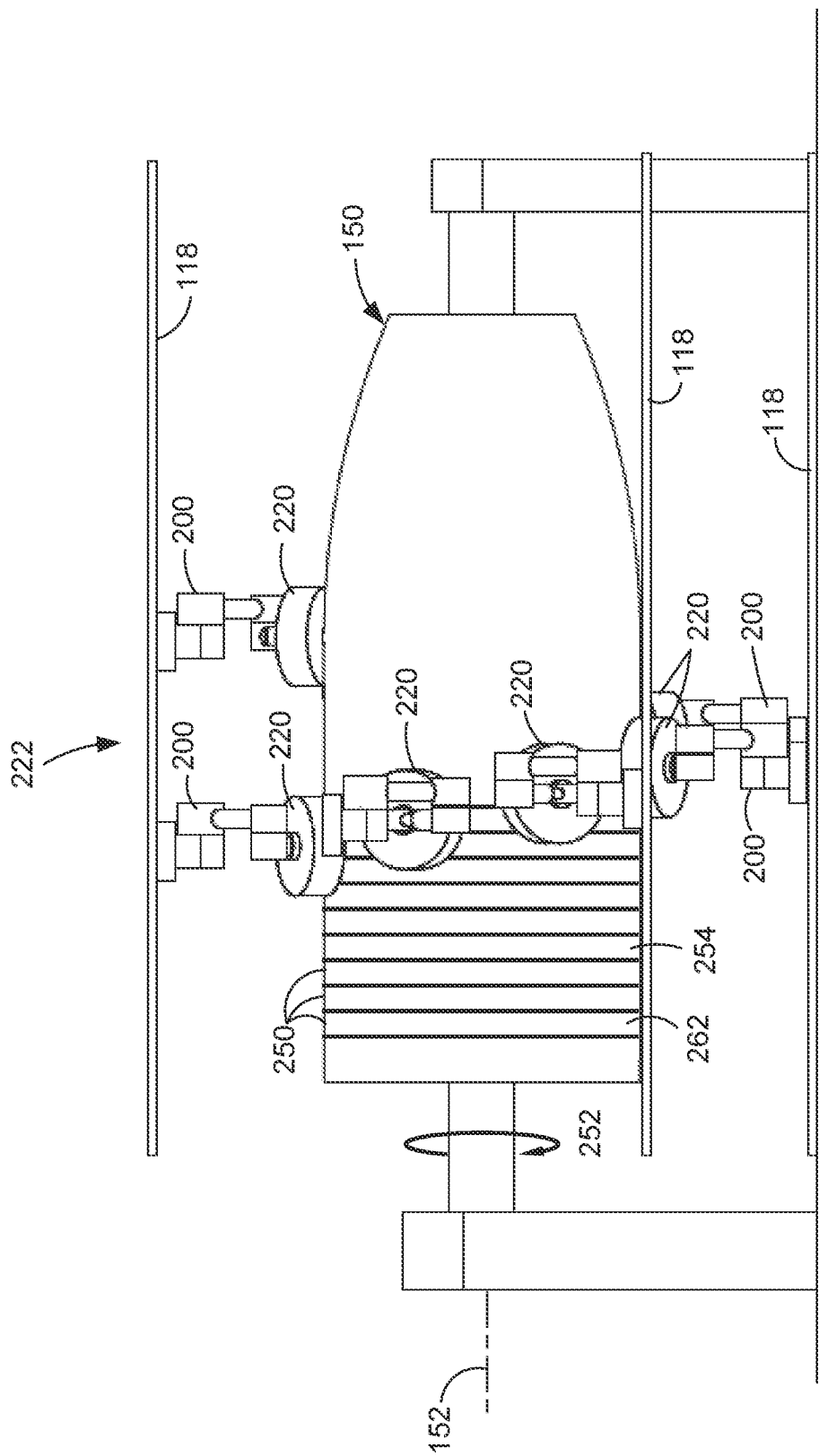
FIG. 20 is a side view of the manufacturing system of FIG. 7, illustrating the head manipulating mechanisms moving the AFP heads in staggered alignment with each other while applying 90-degree composite material onto the layup tool.

Referring back to FIGS. 1-3, each head manipulating mechanism 200 is movable along a lengthwise direction of the rail 118 to which it is mounted. Each rail 118 has a length that allows the head manipulating mechanism 200 to position the AFP head 220 along the entire length of the tool surface 154. The head manipulating mechanisms 200 are configured to independently maintain the AFP heads 220 in circumferentially spaced relation to each other about the tool surface 154 while the AFP heads 220 apply courses 250 (FIGS. 22-23) of layup material 252 to the tool surface 154 or to previously applied layup material 252 when the layup tool 150 is stationary, and during rotation about the tool axis 152. The circumferential spacing 120 (FIG. 8) between the AFP heads 220 is preferably maintained when the AFP heads 220 are moved at the same head velocity along the lengthwise direction of the layup tool 150, or when the AFP heads 220 are stationary (i.e., non-moving along the lengthwise direction). In some examples as shown in FIGS. 16 and 20 and described in greater detail below, the head manipulating mechanisms 200 are configured to adjust a head velocity (i.e., in a direction parallel to the tool axis 152) of one or more of the AFP heads 220 in a manner causing at least some of the AFP heads 220 to longitudinally stagger relative to the remaining AFP heads 220, as necessary to prevent interference with each other while the AFP heads 220 apply layup material 252 to certain areas of the layup tool 150, such as along a tapered section 158.

The manufacturing system 100 has as many AFP heads 220 as possible, such that when all of the AFP heads 220 are longitudinally aligned 224 (i.e., in a single row—FIGS. 9, 15 and 18) with each other, and are located at a point on the layup tool 150 where the circumference is the largest, the AFP heads 220 are circumferentially arranged such that none of the AFP heads 220 are in contact with each other, and such that there is a nominal amount of space between adjacent AFP heads 220 to allow for pivoting of individual AFP heads 220 to accommodate local contour changes in the tool surface 154 and to accommodate varied motion of individual AFP heads 220. The manufacturing system 100 includes a relatively large number of AFP heads 220 (e.g., 3 or more) applying layup material 252 to the layup tool 150 at the same time without interfering with each other, which significantly improves the material laydown rate relative to the material laydown rate of conventional composite layup systems. For example, for the above-described case where the layup tool 150 is configured for laying up a fuselage barrel section 390 (FIG. 5) of a commercial aircraft 392 (FIG. 4), the presently-disclosed manufacturing system 100 increases material laydown by up to 8 times, relative to conventional composite layup systems. Advantageously, such a high material laydown rate enables high-rate production of composite parts at relatively low cost.

Figure 6:
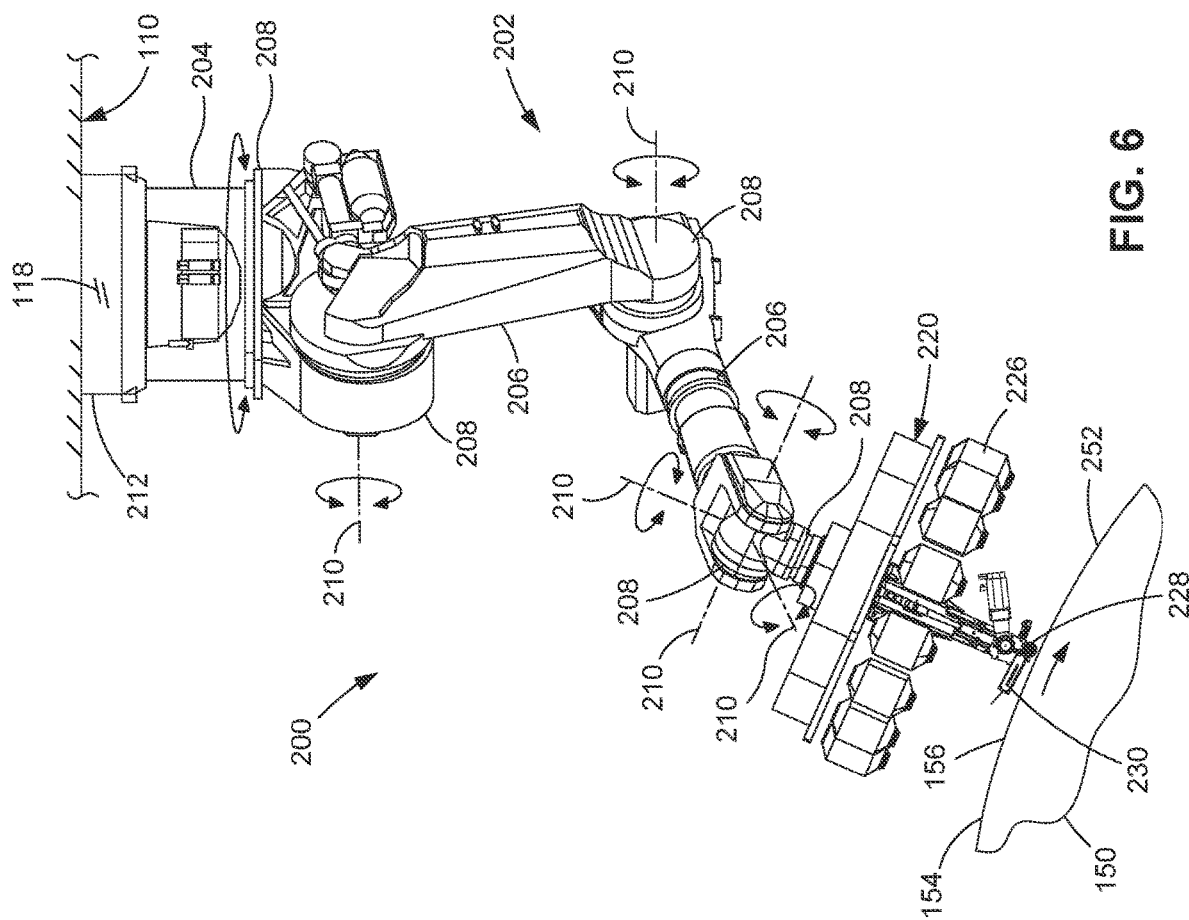
FIG. 6 is an example of one of the AFP heads coupled to a head manipulating mechanism, which is shown configured as a six-axis robotic arm.
Figure 7:
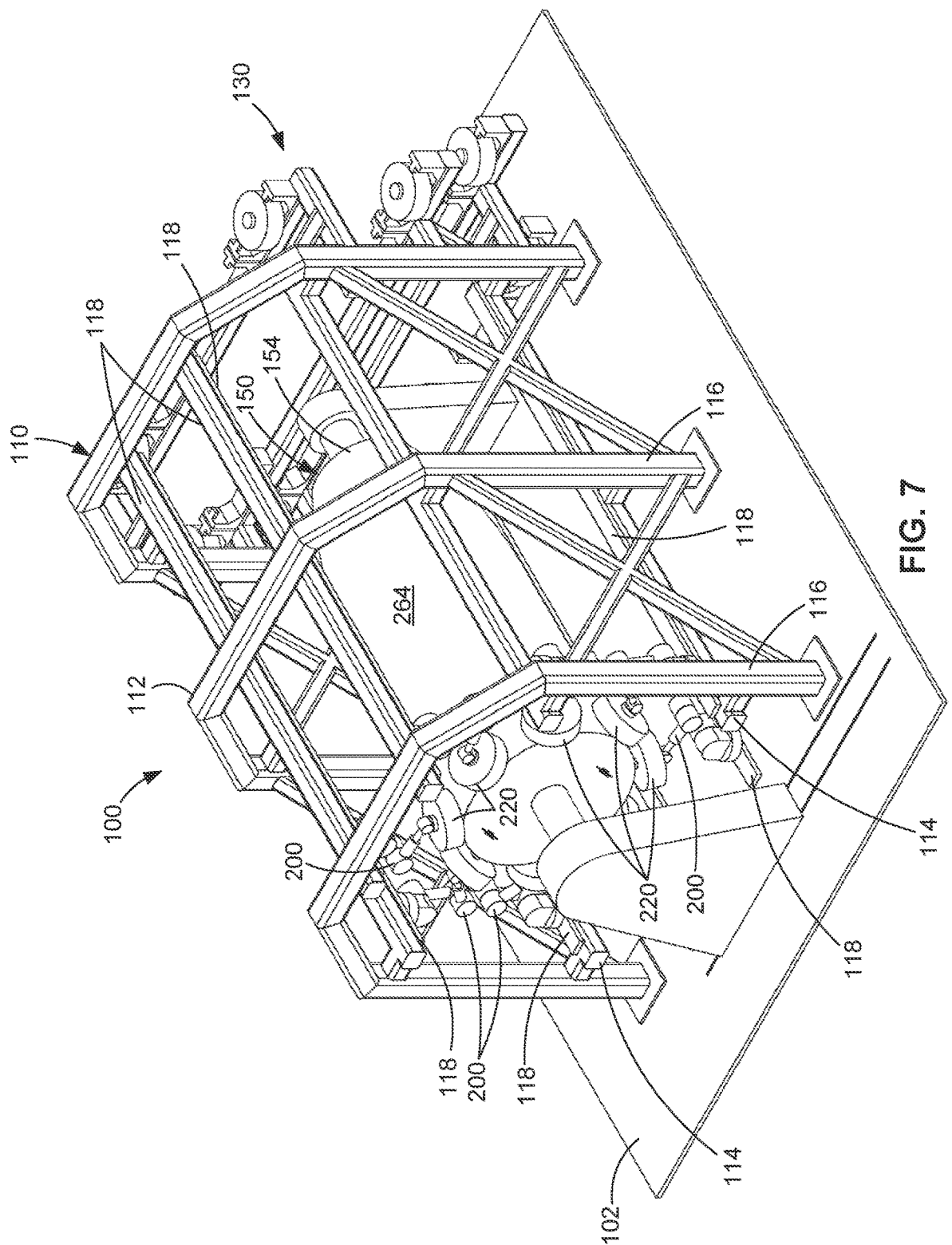
FIG. 7 is a front perspective view of a further example of a manufacturing system having a head changing station located at one end of the layup tool.

Referring to FIG. 6, shown is an example of the head manipulating mechanism 200 configured as a 6-axis robotic arm 202 supporting one of the AFP heads 220 applying layup material 252. As mentioned above, the robotic arm 202 includes an arm base 204 that is coupled to the rail 118. The robotic arm 202 also includes a plurality of arm segments 206 that are interconnected by arm joints 208. The robotic arm 202 enables movement of the AFP head 220 along and/or about 6 rotary axes 210. The rail 118 provides a linear axis 212 for movement of the AFP head 220. Although not shown, each head manipulating mechanism 200 may also include a linear feeder axis.

Although a 6-axis robotic arm 202 is shown in the figures, the head manipulating mechanisms 200 may be provided in any one of a variety of alternative configurations that allow the AFP heads 220 to follow preprogrammed tool paths along the layup tool 150, including along tapered sections 158 (FIG. 2), while continuously orienting the AFP heads 220 in conformance with (e.g., perpendicular to) the local contours of the tool surface 154. Movement of each AFP head 220 includes rotation about an axis (not shown) normal to the tool axis 152, for reversing the laydown direction of the AFP head 220. In addition, movement of each AFP head 220 includes translation of the AFP head 220 along the axis normal to the tool axis 152, for alternately moving the AFP heads 220 on and off the layup tool 150 respectively at the start and end of each course 250.

Referring to FIGS. 7-14, shown is another example of a manufacturing system 100 for fabricating a green state layup 264. The manufacturing system 100 of FIGS. 7-14 is similar to the above-described manufacturing system 100 of FIGS. 1-3, except for the addition of a head changing station 130 in FIGS. 7-14, described in greater detail below. The manufacturing system 100 of FIGS. 7-14 includes the above-described rails 118, which are supported by a frame assembly 110. In addition, the manufacturing system 100 includes a plurality of AFP heads 220, each coupled to a dedicated head manipulating mechanism 200 (e.g., robotic arm). As described above, the head manipulating mechanisms 200 maintain the AFP heads 220 in circumferentially spaced relation to each other about the tool surface 154 of the layup tool 150, while the AFP heads 220 apply layup material 252 (FIG. 22) to the tool surface 154 or to previously applied layup material 252. As mentioned above and described in greater detail below, the head manipulating mechanisms 200 are configured to adjust the head velocity of one or more of the AFP heads 220 as necessary to cause at least some of the AFP heads 220 to longitudinally stagger relative to the remaining AFP heads 220, to prevent interference between the AFP heads 220 during the application of layup material 252 to certain sections of the layup tool 150.

Figure 9:
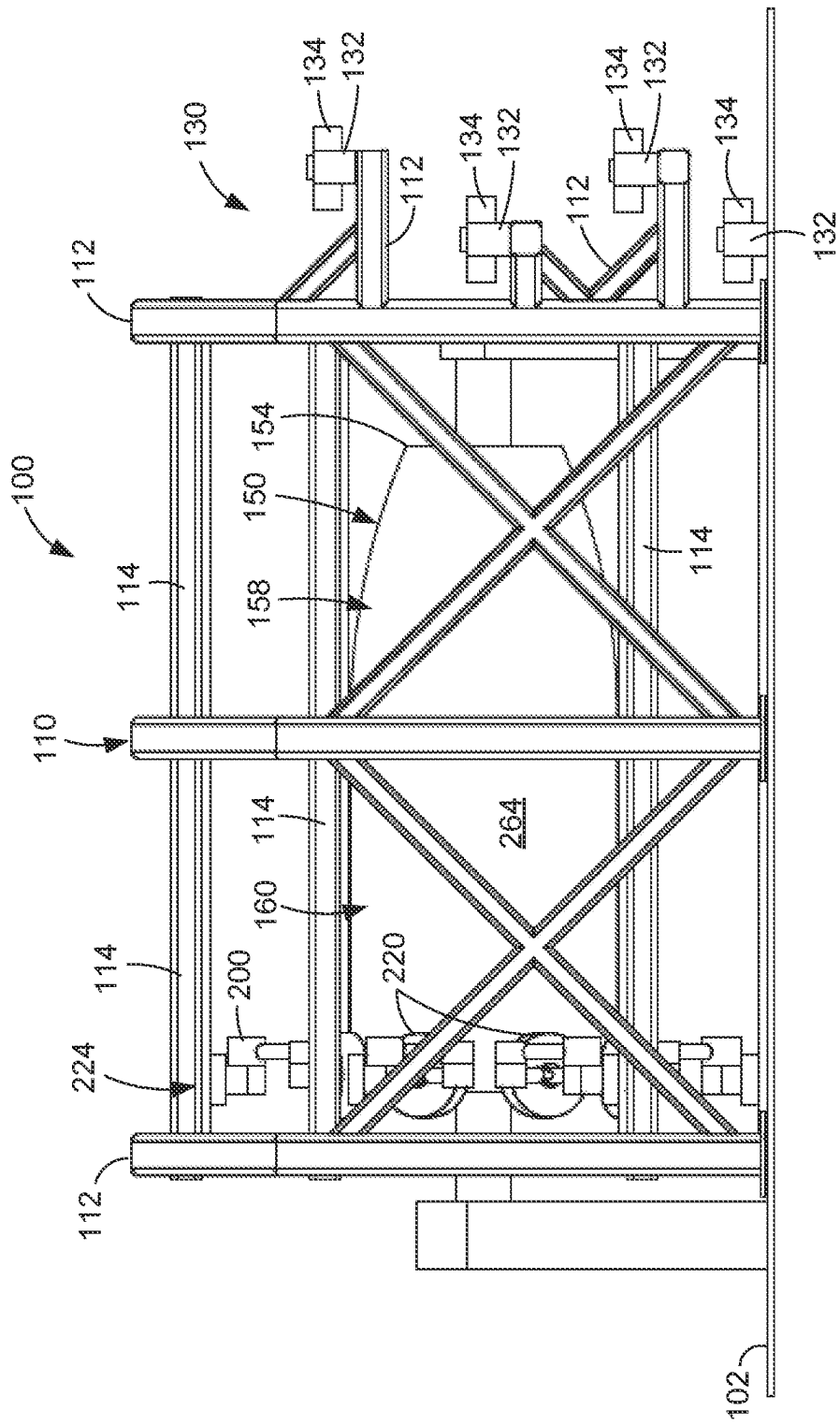
FIG. 9 is a side view of the manufacturing system of FIG. 7 showing the head changing station.
Figure 10:
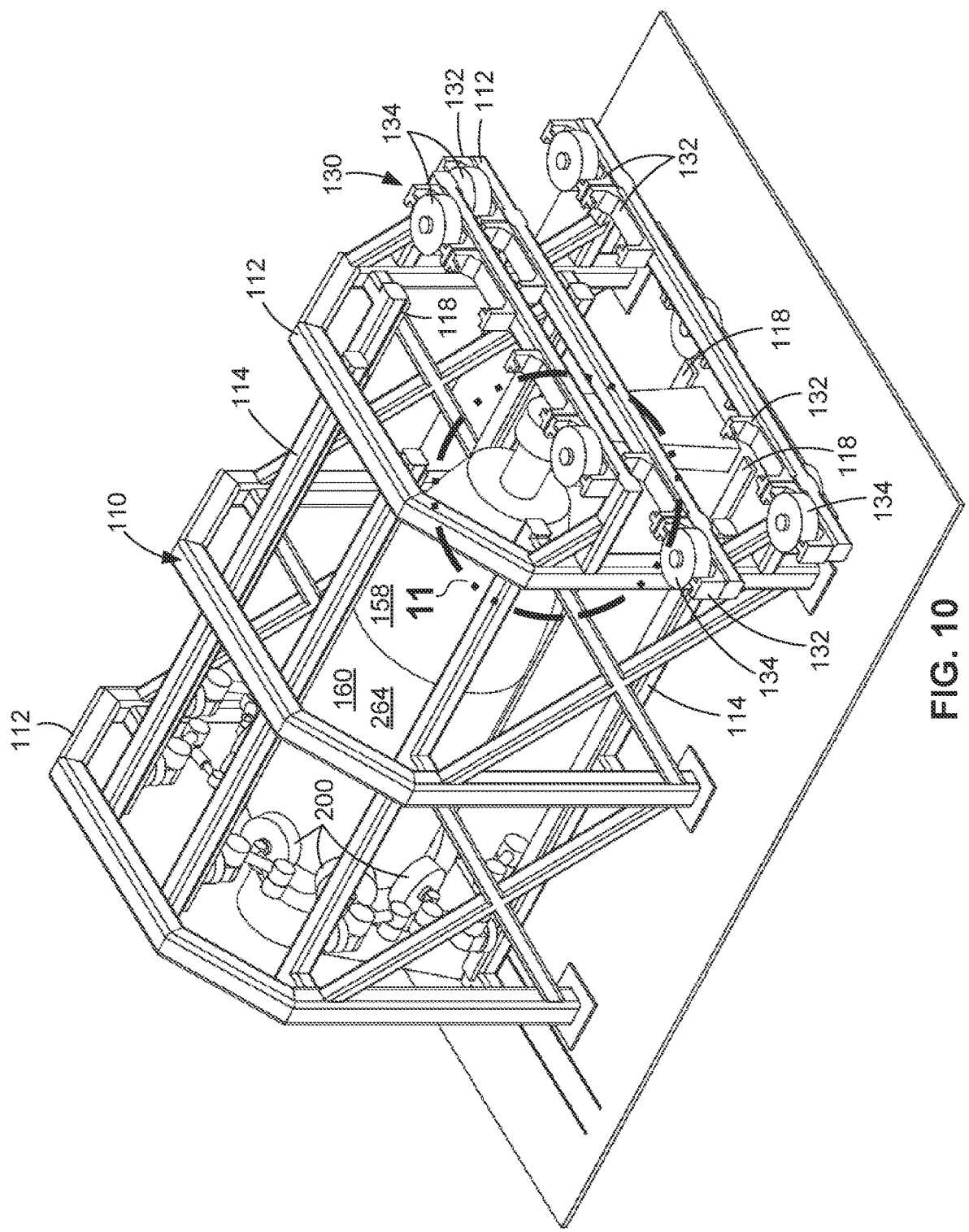
FIG. 10 is a rear perspective view of the manufacturing system of FIG. 7 showing the head changing station.

In the example of FIGS. 7-14, the layup tool 150 has a constant section 160 (e.g., a cylindrical portion) and a tapered section 158 (FIG. 9). The manufacturing system 100 includes 8 AFP heads 220, respectively coupled to 8 head manipulating mechanisms 200. The 8 head manipulating mechanisms 200 are respectively coupled to 8 rails 118. The AFP heads 220 are circumferentially spaced around the layup tool 150. In some examples, when the AFP heads 220 are longitudinally aligned 224 with each other (i.e., in a single row) as shown in FIG. 9, the AFP heads 220 are circumferentially spaced apart from each other by an amount that allows for unimpeded movement (e.g., rotation) of each AFP head 220 (e.g., via the head manipulating mechanism) without interfering with the AFP heads 220 on opposite sides. The ability of each AFP head 220 to be rotated in an unimpeded manner (i.e., without contacting the adjacent AFP heads 220 on opposite sides) allows the orientation of each AFP head 220 to be adjusted as necessary to continuously maintain the AFP head 220 perpendicular to the local contour of the tool surface 154.

In any the examples disclosed herein, the plurality of AFP heads 220 comprises n quantity of AFP heads 220, and the plurality of head manipulating mechanisms 200 are configured to circumferentially (i.e., equiangularly) space the AFP heads 220 apart from each other by approximately 360 degrees/n. In defining the circumferential spacing 120 (FIG. 8), the center tool point (not shown) of each AFP head 220 may be located at the center of its circumferential reach.

Although FIGS. 1-3 and 7-14 show 8 AFP heads 220, the total quantity of AFP heads 220 in a given manufacturing system 100 is dictated by the size of the layup tool 150. More specifically, the total quantity of AFP heads 220 is dependent upon the cross-sectional width and/or the maximum circumference of the layup tool 150, and is based upon the AFP heads 220 being longitudinally aligned 224 with each other (e.g., FIG. 9) and having clearance with adjacent AFP heads 220. In this regard, a layup tool 150 having a relatively large circumference or cross-sectional width allows for a correspondingly larger number of AFP heads 220 (e.g., up to 12 AFP heads 220), and a layup tool 150 with a smaller circumference or cross-sectional width dictates a smaller number of AFP heads 220. The total quantity of AFP heads 220 is selected to reduce or minimize the total number of passes or courses required by the AFP heads 220 to fabricate a green state layup 264. Preferably, a manufacturing system 100 includes as many AFP heads 220 as possible to maximize the material laydown rate, and the head manipulating mechanisms 200 are configured to move the AFP heads 220 at an optimal head velocity, and in a manner avoiding interference with each other.

As shown in FIGS. 9-14, the manufacturing system 100 includes a head changing station 130 located at one of opposing ends of the layup tool 150. The head changing station 130 is comprised of beam members 112 are coupled to the frame assembly 110. The beam members 112 support a plurality of head stands 132. Each head stand 132 is configured to support an AFP head 220. In the example shown, the head changing station 130 is configured to provide at least one replacement AFP head 134 at the end of each rail 118. The head changing station 130 is configured in a manner to avoid limiting the motion of any of the head manipulating mechanisms 200, and to avoid limiting the motion of any of the AFP heads 220. In addition, the head changing station 130 is preferably configured to provide the option for changing out of all of AFP heads 220 at the same time.

In FIGS. 9-14, each AFP replacement head is supported on a head stand 132. In the example shown, each replacement head is supported by a head stand 132 that is located adjacent to an unoccupied head stand 132. However, in other examples not shown, the head changing station 130 may be configured such that each head stand 132 can translate and/or rotate in a manner to present a replacement AFP head 134 to a head manipulating mechanism 200, thereby minimizing the motion requirements of the head manipulating mechanism 200, and thereby reducing the amount of downtime of each AFP head 220 during fabrication of a green state layup 264. An AFP head 220 may require replacement due to a mechanical malfunction, to perform periodic maintenance, to accommodate a change in the type of layup material 252 required in certain regions or plies of the green state layup 264, and/or in anticipation of expending the layup material 252 carried on the material rolls 226 of the AFP head 220.

Figure 11:
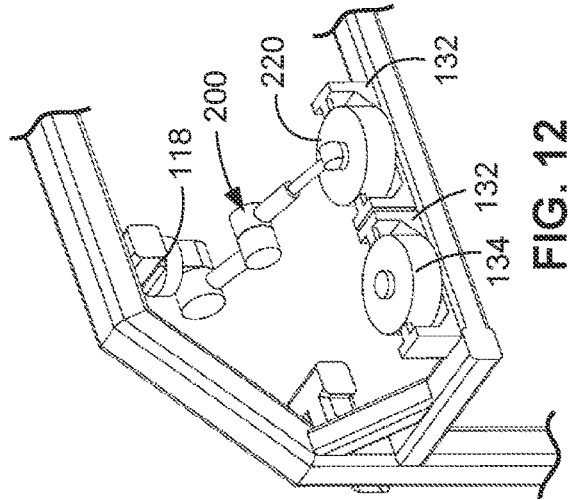
FIG. 11 is a perspective view of the portion of the manufacturing system identified by reference numeral 11 of FIG. 10, and illustrating one of the head manipulating mechanisms moving an AFP head toward an empty head stand of the head changing station.
Figure 12:
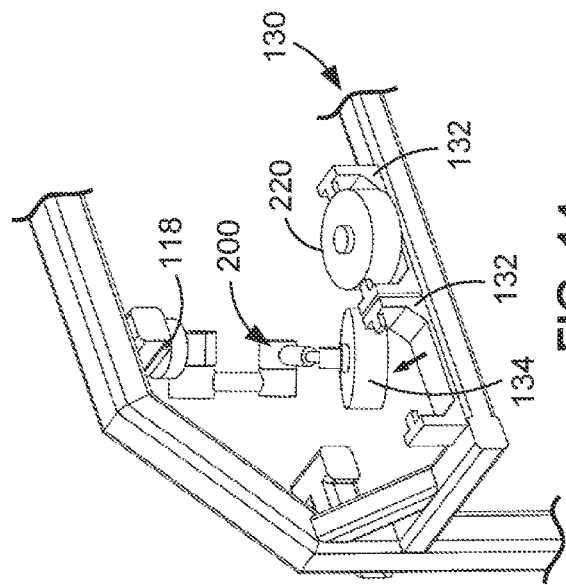
FIG. 12 shows the head manipulating mechanism releasing the AFP head onto an unoccupied head stand.

In the sequence of FIGS. 11-14, to replace an AFP head 220, a head manipulating mechanism 200 may move to the end of its rail 118, at the location of the head changing station 130. The head manipulating mechanism 200 may extend the currently loaded AFP head 220 toward an empty head stand 132 on the head changing station 130, as shown in FIG. 11. Once the currently loaded AFP head 220 is aligned with (e.g., positioned directly over) an unoccupied head stand 132, the head manipulating mechanism 200 slowly lowers and releases the AFP head 220 onto the unoccupied head stand 132, as shown in FIG. 12. Although not shown, each head manipulating mechanism 200 may have a quick-release mechanism (not shown) configured to release and engage with the AFP heads 220.

Figure 13:
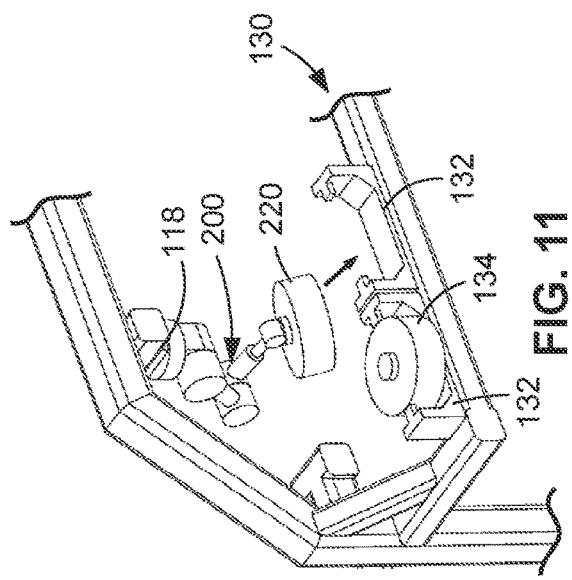
FIG. 13 shows the head manipulating mechanism rotating toward another head stand containing a replacement AFP head.
Figure 14:
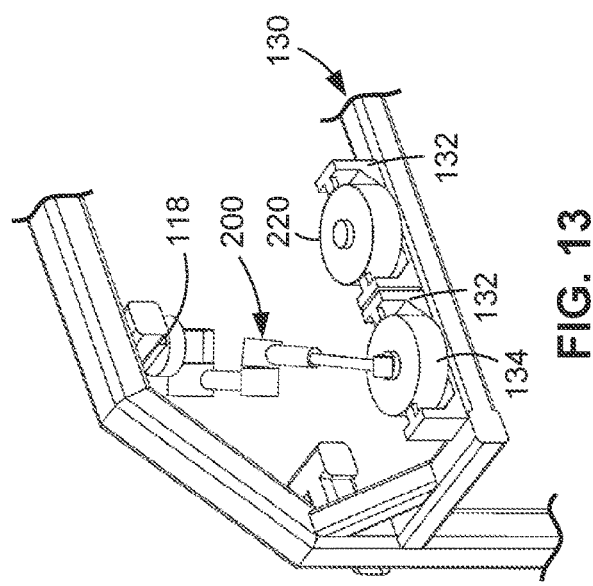
FIG. 14 shows the engagement of the replacement AFP head with the head manipulating mechanism.

After releasing the AFP head 220 (e.g., FIG. 12), the head manipulating mechanism 200 prepares to engage with a replacement AFP head 134. In the example of FIG. 13, the head manipulating mechanism 200 moves (e.g., rotates) toward a head stand 132 that contains a replacement AFP head 134. In other examples not shown, the head stand 132 may be movable in a manner to present a replacement AFP head 134 to the head manipulating mechanism 200, as mentioned above. Regardless of whether the head stand 132 is fixed (e.g., FIGS. 11-14) or movable (not shown), the head manipulating mechanism 200 engages with a replacement AFP head 134, as shown in FIG. 14. The head manipulating mechanism 200 then moves the replacement AFP head 134 back into service with the other AFP heads 220, which may continue fabricating the green state layup 264 throughout the head change operation.

Advantageously, the head changing station 130 provides a means for minimizing downtime of the AFP heads 220 during fabrication of a green state layup 264, and/or minimize or prevent the need for rework of the green state layup 264 due to any one of a variety of tow anomalies 300 (FIG. 24), as described in greater detail below. The manufacturing system 100 may also be configured to proactively change out the AFP heads 220 prior to the occurrence of a situation that necessitates an unplanned head change. For example, for each AFP head 220, the manufacturing system 100 may be configured to perform a predetermined number of head changes prior to the AFP head 220 reaching its previously established tow failure rate. A tow failure may be described as the failure of an AFP head 220 to lay up a tow 256 (i.e., composite material 254) along its predetermined length per design intent. The tow failure may involve an error associated with adding the tow 256 to the green state layup 264 at a predetermined tow start, and or the tow failure may involve an error associated with cutting the tow 256 at a predetermined tow end.

To illustrate the advantages of proactive head changes, in fabricating a green state layup 264 requiring 120,000 individual tows 256 using 8 AFP heads 220, each AFP head 220 must apply approximately 15,000 tows 256. If each AFP head 220 has a previously established tow failure rate of 1 in 10,000, then the manufacturing system 100 may be configured to proactively change out each AFP head 220 upon reaching half the failure rate (e.g., at 5000 tows), and may thereby avoid the need to rework the green state layup 264 due to the absence of anomalies 300. A failure rate of 1 in 5000 requires 3 head changes per AFP head 220. Assuming that each head change takes approximately 5 minutes, and assuming that all of the AFP heads 220 are changed out at the same time, the total amount of head downtime during fabrication of the green state layup 264 is approximately 15 minutes, which is significantly less than the amount of time required to rework the green state layup 264 due to anomalies 300 caused by tow failures.

Figure 15:
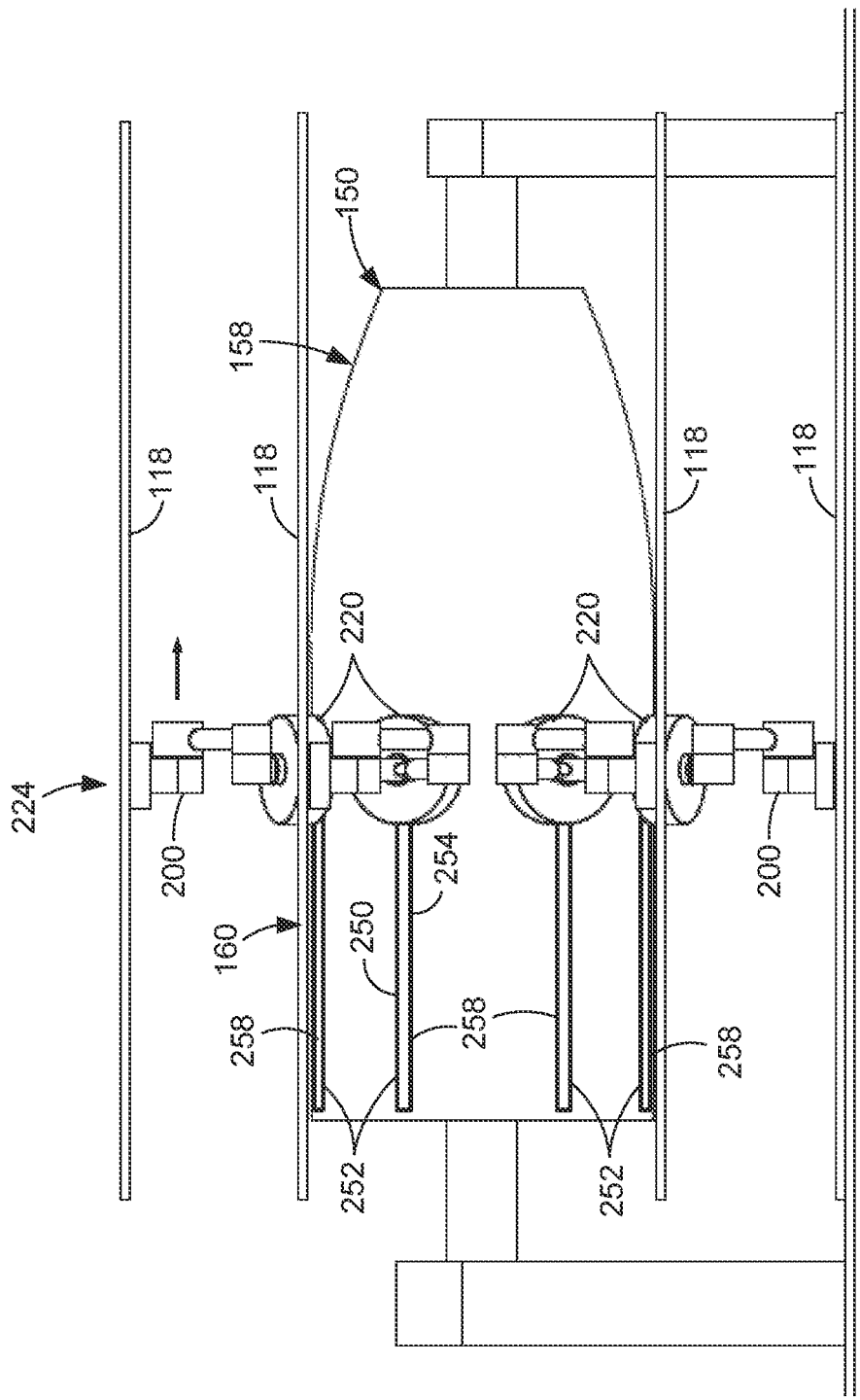
FIG. 15 is a side view of the manufacturing system of FIG. 7 with the frame assembly removed, and illustrating the head manipulating mechanisms moving the AFP heads in longitudinal alignment with each other while applying composite material of a 0-degree ply onto a constant section of the layup tool.
Figure 17:
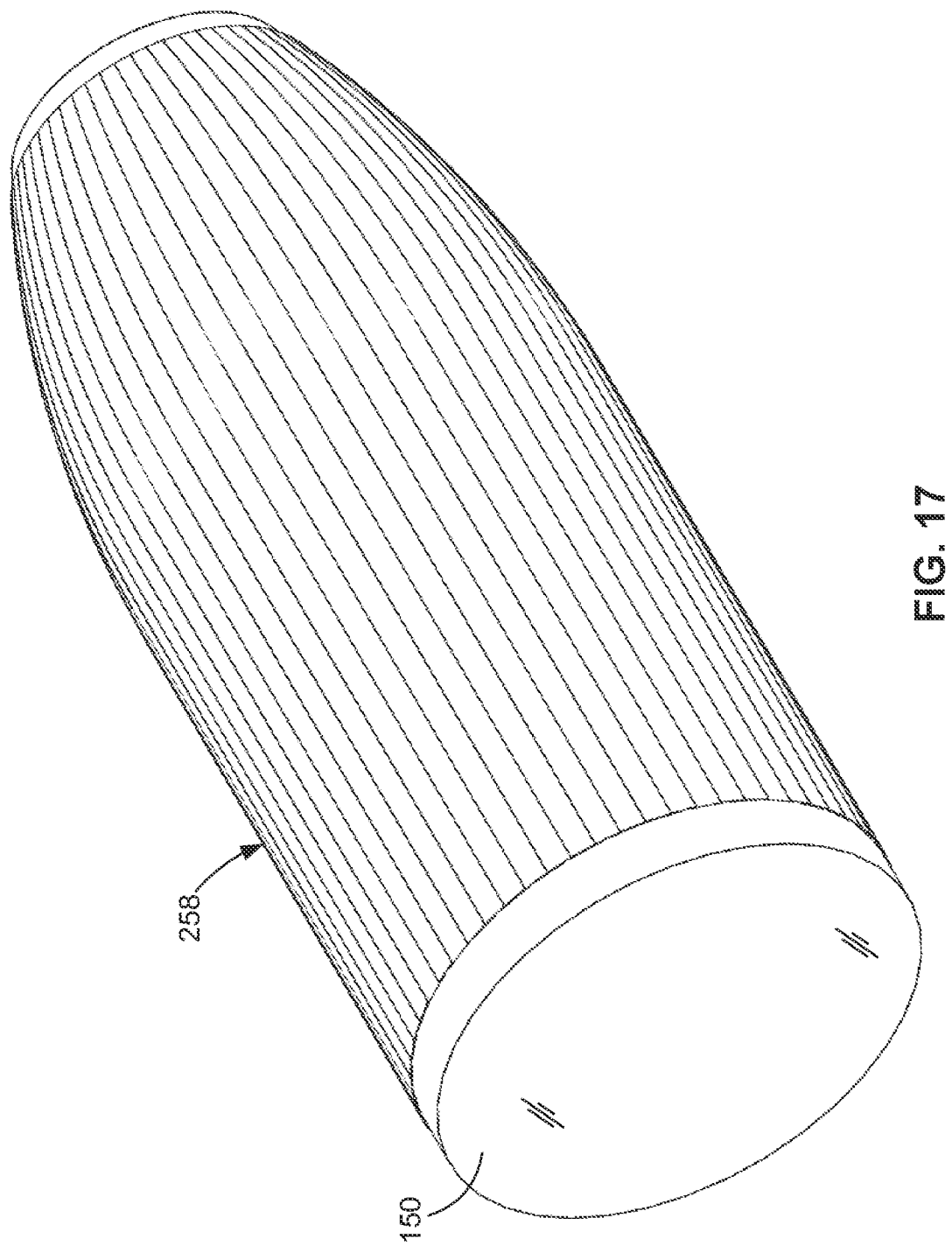
FIG. 17 is a perspective view of the layup tool after the application of a 0-degree ply.

Referring now to FIGS. 15-21, shown are examples of the relative positions (e.g., staggered versus aligned) of the AFP heads 220 when applying layup material 252 at different orientations on the layup tool 150. For example, FIGS. 15-16 show the AFP heads 220 laying up a 0-degree ply 258 of composite material 254. When laying up 0-degree plies 258, the layup tool 150 is generally stationary (i.e., non-rotated) while the AFP heads 220 are moved longitudinally along the lengthwise direction of the layup tool 150, although the layup tool 150 may be rotated when the AFP heads 220 are in a tapered section 158. FIG. 17 shows an example of the layup tool 150 after application of the 0-degree ply 258.

As mentioned above, the example layup tool 150 shown has a constant section 160 where the cross-sectional width of the layup tool 150 is constant, and a tapered section 158 where the cross-sectional width of the layup tool 150 decreases. FIG. 15 illustrates the head manipulating mechanisms 200 moving along the rails 118 while maintaining the AFP heads 220 in longitudinal alignment 222 with each other as each of the AFP heads 220 applies composite material 254 to the layup tool 150.

FIG. 16 illustrates the AFP heads 220 moving along the tapered section 158 of the layup tool 150. The head manipulating mechanisms 200 temporarily adjust the head velocity of the AFP heads 220 in a manner to longitudinally stagger 222 the AFP heads 220 relative to each other to avoid interference between adjacent AFP heads 220. The head velocity of the AFP heads 220 is dictated by the velocity of the head manipulating mechanisms 200 along the rails 118. The head manipulating mechanisms 200 may adjust the relative longitudinal positions of the AFP heads 220 by temporarily decreasing the head velocity of alternating AFP heads 220 (e.g., alternating, when viewed from the end—FIG. 8) while the remaining AFP heads 220 continue to move at the same head velocity. Alternatively, the head velocity of alternating AFP heads 220 may be increased while the remaining AFP heads 220 continue to move at the same head velocity. In a still further example, adjustment of the relative longitudinal positions of the AFP heads 220 may be achieved by a combination of decreasing the head velocity of alternating AFP heads 220, and increasing the head velocity of the remaining AFP heads 220.

The head velocity is adjusted such that the AFP heads 220 are longitudinally staggered 222 by an amount preventing interference between the AFP heads 220, and which would otherwise occur due to a gradual decrease in circumferential clearance between the adjacent AFP heads 220 as they gradually move radially inwardly while follow the surface contour of the tapered section 158. When the AFP heads 220 return to a location on the layup tool 150 where longitudinal staggering 222 is no longer required, the AFP heads 220 may be gradually moved back into longitudinal alignment to 24 (e.g., FIG. 15) by reversing one of the above-described examples of longitudinal staggering.

Although the shape of the layup tool 150 of FIGS. 15-16 dictates longitudinal staggering of alternate AFP heads 220, the layup tool 150 may be provided in other shapes that only require longitudinal staggering of the AFP heads 220 on one side of the layup tool 150, and no longitudinal staggering is required on an opposite side of the layup tool 150. For example, the shape of the layup tool 150 of FIGS. 1-3 requires longitudinal staggering of only two of the AFP heads 220 when the plurality of AFP heads 220 move into the tapered section 158 of the layup tool 150, which is the right-hand side of the layup tool 150 in FIG. 2.

Control of the movement of the head manipulating mechanisms 200 and the AFP heads 220, and control of the tool rotation may be performed by one or more controllers 360 (FIG. 3). In one example, the manufacturing system 100 includes a master controller (not shown) coordinating with one or more slave controllers (not shown). The one or more controllers 360 command the head manipulating mechanisms 200 to move along the rails 118 in a manner to longitudinally stagger the AFP heads 220 relative to each other, and thereby avoid interference between adjacent AFP heads 220 as the AFP heads 220 move radially inwardly while applying composite material 254 over the tapered section 158. As mentioned above, the total amount of time required to fabricate a green state layup 264 is dictated in large part by the head velocity of the AFP heads 220. The ability to move each AFP head 220 at its optimal head velocity results in the shortest completion time, and a minimal number of anomalies 300 in the green state layup 264. Maximum efficiency is achieved by minimizing the amount of longitudinal staggering of the AFP heads 220, so that no additional time is added to the layup process.

Figure 18:
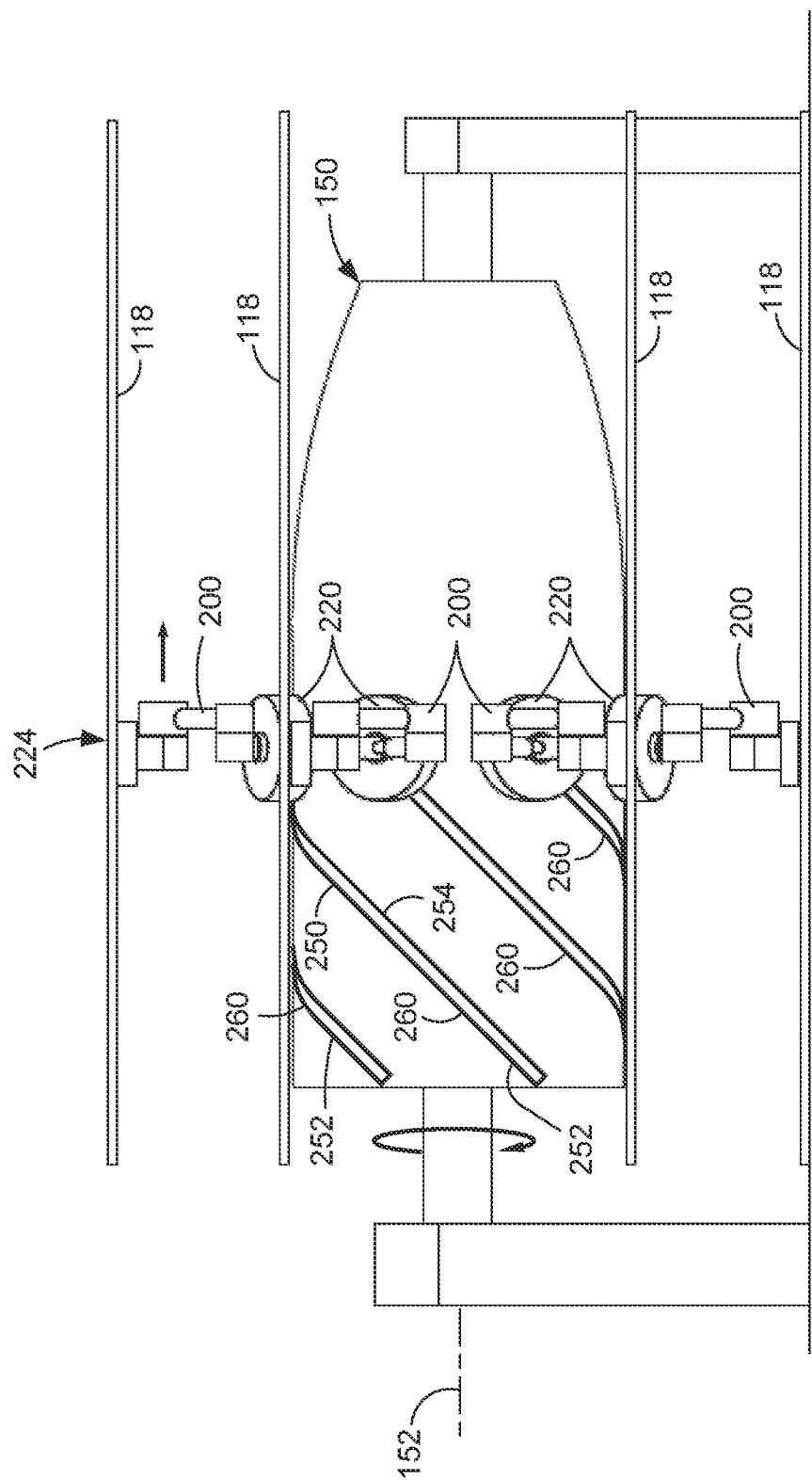
FIG. 18 is a side view of the manufacturing system of FIG. 7, illustrating the head manipulating mechanisms moving the AFP heads in longitudinal alignment with each other while applying 45-degree composite material onto the layup tool.
Figure 19:
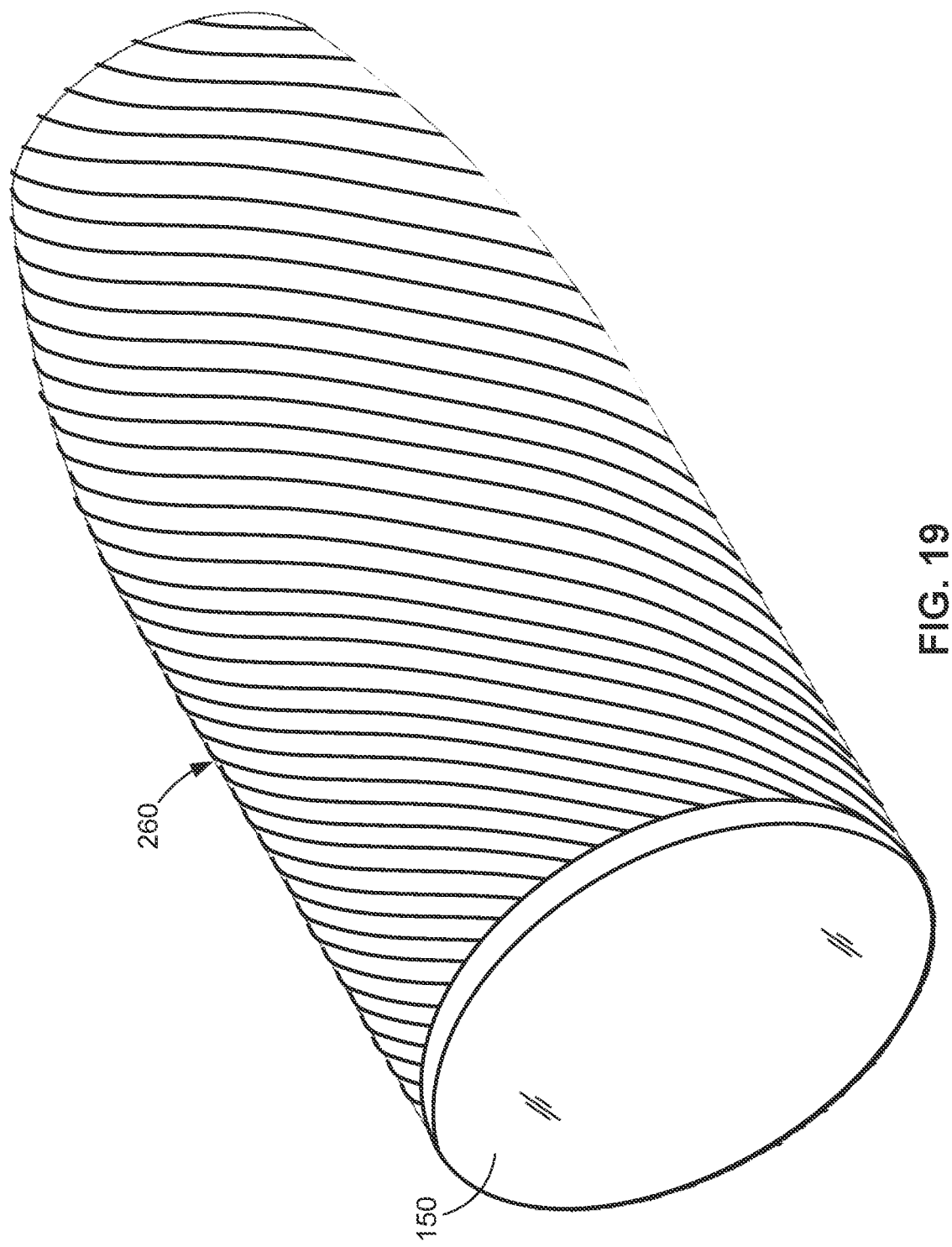
FIG. 19 is a perspective view of the layup tool after the application of a 45-degree ply.

Referring to FIGS. 18-19, shown in FIG. 18 are the AFP heads 220 laying up a 45-degree ply 260 of composite material 254. FIG. 19 shows the layup tool 150 after the 45-degree ply 260 has been completed. When laying up 45-degree plies 260, the layup tool 150 is rotated about the tool axis 152 while the AFP heads 220 are moved longitudinally in a coordinated manner along the lengthwise direction of the layup tool 150. In operating the manufacturing system 100, the control architecture may be such that the tool axis 152 is the master axis, and movements of the head manipulating mechanisms 200 and the AFP heads 220 (e.g., tow adds and tow cuts) are slave to the rotation of the layup tool 150 about the tool axis 152.

FIG. 18 shows the head manipulating mechanisms 200 moving along the rails 118 while maintaining the AFP heads 220 in longitudinal alignment 224 with each other as each AFP head 220 applies a course 250 of composite material 254 to the constant section 160 of the layup tool 150. Although not shown, when the AFP heads 220 move into the tapered section 158 of the layup tool 150, the head manipulating mechanisms 200 adjust the head velocity of alternating AFP heads 220 in a manner similar above-described process shown in FIG. 16, to cause longitudinal staggering 222 in a manner preventing interference between adjacent AFP heads 220.

Figure 21:
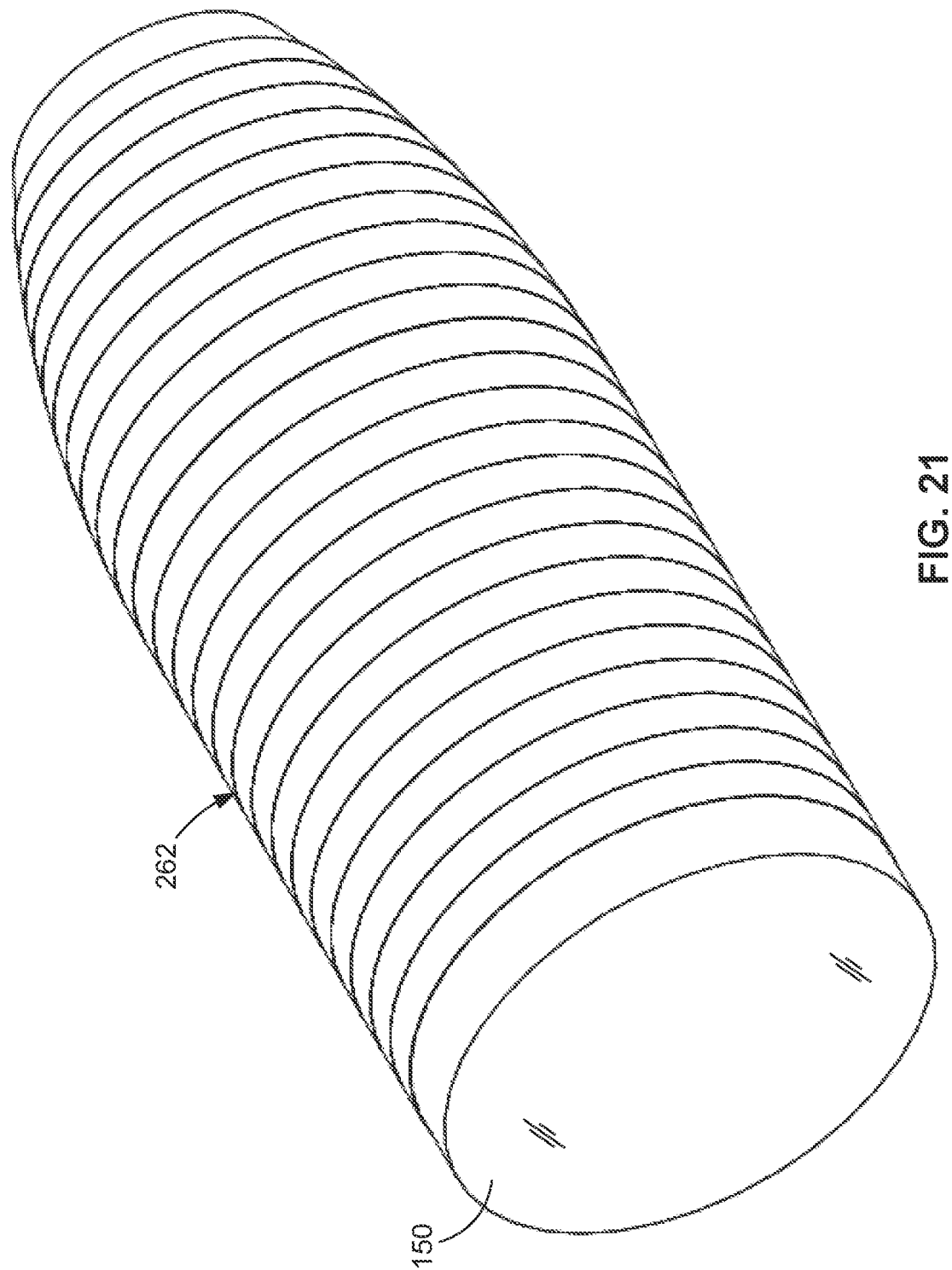
FIG. 21 is a perspective view of the layup tool after the application of a 90-degree ply.

Referring to FIGS. 20-21, shown in FIG. 20 are the AFP heads 220 laying up a 90-degree ply 262 of composite material 254. FIG. 21 shows the layup tool 150 after the 90-degree ply 262 has been completed. When laying up 90-degree plies 262, the layup tool 150 is rotated about the tool axis 152 while the AFP heads 220 are generally longitudinally stationary, and are not moved in the lengthwise direction, except for some longitudinal motion as may be required to allow the AFP heads 220 to follow their respective preprogrammed tool paths and remain locally normal to a tool surface 154 having a complex contour. Generally, each AFP head 220 is maintained in fixed longitudinally staggered relation by an amount equivalent to the width of the course 250 of composite material 254 (e.g., the band of side-by-side tows 256—FIG. 23) being applied by the AFP heads 220. After completing each revolution, the rotation of the layup tool 150 may be temporarily halted to allow the head manipulating mechanisms 200 to shift the plurality of AFP heads 220 in the longitudinal direction by an amount such that the subsequently applied courses 250 are in side-by-side abutting relation to the previously applied courses 250. As the AFP heads 220 move into the tapered section 158 of the layup tool 150, the head velocity of some of the AFP heads 220 is adjusted to cause the AFP heads 220 to be longitudinally staggered 222 to prevent interference between adjacent AFP heads 220.

Another method of laying up plies that are oriented approximately 90-degrees is to program spiral tool paths for the AFP heads 220, and start the AFP heads 220 simultaneously on one end of the layup tool 150, and spirally apply side-by-side (i.e., abutted) courses of composite material 254 along the length of the layup tool 150. Such a method will introduce a fiber angle deviation equal to the quantity of AFP heads 220 times the course width, divided by the local circumference of the layup tool 150. However, for a layup tool 150 having a relatively large cross-sectional width, the fiber angle deviation may be relatively small. For example, for a manufacturing system having 8 AFP heads 220 each applying an 8-inch wide course of composite material 254 over a layup tool 150 having a diameter of 14 feet, the fiber angle deviation from 90-degrees is 7 degrees, which may be deemed acceptable, considering that such method is faster than the above-described method shown in FIG. 20.

Referring now to FIGS. 22-23, shown in FIG. 23 is an example of an AFP head 220 applying layup material 252 to the tool surface 154. As mentioned above and shown in FIG. 22, each one of the AFP heads 220 has a compaction roller 228 for compacting the course 250 of layup material 252 onto the substrate 156. The substrate 156 comprises the tool surface 154 or previously applied layup material 252. Each AFP head 220 has a heating device 230 for improving the level of tack (e.g., adhesion) between the course 250 and the substrate 156. Heat 232 applied by the heating device 230 to the substrate 156 reduces the viscosity of the resin in previously-applied composite material 254, thereby increasing the level of tack between the course 250 and the substrate 156. Additionally, the application of heat 232 to the substrate 156 reduces resin viscosity in the course 250, due to conduction of heat 232 from the substrate 156 into the course 250 as shown in FIG. 22. The heating device 230 may be provided as an infrared heater, a laser heater, a xenon flash lamp, or any one of a variety of alternative heating device configurations Each AFP head 220 includes at least one tow sensor 234 configured to capture layup data 270 (FIG. 33) of each course 250 of layup material 252 after application onto the substrate 156. In the example shown, the tow sensor 234 is located on the downstream side of the compaction roller 228. Each tow sensor 234 is configured to capture layup data 270 as the AFP head 220 moves relative to the tool surface 154. As described below, the layup data 270 is used for measuring the quality of each course 250 of layup material 252 after application onto the substrate 156. The layup data 270 is received by a processor 362 (FIG. 33), which analyzes the layup data 270 for detecting anomalies 300 in the green state layup 264.

In the example of FIG. 23, the layup material 252 comprises side-by-side tows 256 of composite material 254. However, as indicated above, the layup material 252 may comprise non-composite material such as films, adhesives, or layers that may facilitate the laying up or processing of the green state layup 264. The tow sensors 234 on the AFP heads 220 are configured to capture layup data 270 (FIG. 33) continuously or at periodic intervals. For example, depending on the head velocity of the AFP heads 220, the tow sensors 234 may capture layup data 270 every tenth of a second, or after every few inches of travel of the AFP head 220 relative to the tool surface 154, to ensure that layup data 270 of the entire length of each course 250 is captured.

In FIG. 23, the tow sensor 234 is an imaging device 236. The imaging device 236 is configured to capture a series of layup images 272 (FIG. 24) of the layup material 252 (e.g., composite tows 256) immediately after application onto the tool surface 154 or onto previously applied layup material 252. In one example, the imaging device 236 may be a visible-light camera (not shown) configured to capture a series of visible light images of the layup material 252 immediately after application onto the substrate 156. In the example of FIG. 23, the imaging device 236 is an infrared camera 238 configured to capture a series of infrared images 274 (FIG. 24) of the layup material 252. The infrared camera 238 is mounted and oriented such that the field of view of the infrared camera 238 extends across the entire width of the course 250. The field of view of the infrared camera 238 may additionally capture a small section of the substrate 156 on opposite sides of the course 250. Although FIG. 23 shows a single infrared camera 238 mounted to the AFP head 220, in other examples not shown, each AFP head 220 may include two or more infrared cameras 238, each mounted in a manner to capture different regions of the course 250 immediately after application onto the substrate 156.

Figure 24:
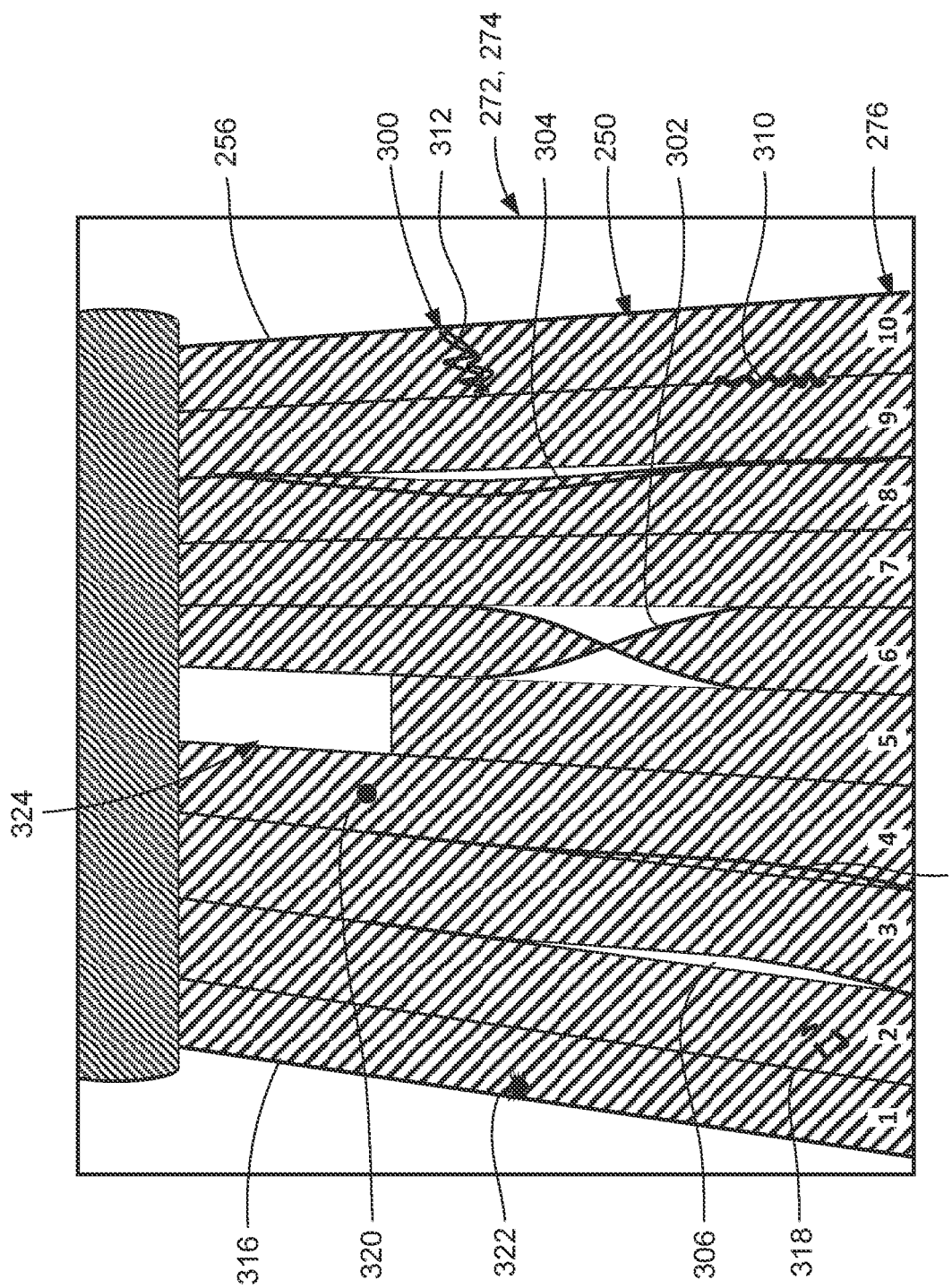
FIG. 24 shows an example of a layup image captured by the infrared camera, and illustrating examples of different types of anomalies potentially occurring in the tows during application by the AFP head.

FIG. 24 shows an example of an infrared image 274 captured by the infrared camera 238 (FIG. 23) as a result of heat 232 (FIG. 23) from the substrate 156 (FIG. 22) conducting up into the recently-applied layup material 252 (FIG. 22). Although the tows 256 (FIG. 23) of a course 250 are preferably applied to the substrate 156 in non-overlapping and non-gapped relation with each other as shown in FIG. 23, anomalies 300 (e.g., tow failures) may occur in the course 250. As shown in FIG. 24, any one or more of a variety different types of anomalies 300 may occur in the tows 256 during application by the AFP head 220. Each of the tows 256 is assigned a tow identification number 276, which may facilitate physically locating anomalies 300 in the green state layup 264 for manual inspection and potential rework. In the infrared image 274 of FIG. 24, the anomaly types include: a twist 302, a fold 304, a gap 306, an overlap 308, bridging (not shown), puckers 310, wrinkles 312, missing tows 256, low-quality tack 316, a resin ball 320, a fuzz ball 322, or foreign object debris 318.

A twist 302 may be described as a location along the length of a tow 256 where the composite material 254 has spirally wound (e.g., 180 degrees) around itself as it is laid down on the substrate 156 by the AFP head 220. A fold 304 may be described as a location along the length of a tow 256 where the composite material 254 has doubled up or folded over on itself when laid down by the AFP head 220. A dropped tow 324 may be described as a tow 256 initially applied to the substrate 156, but which is unintentionally cut by the AFP head 220, or is a result of the depletion of material from a material roll 226 on the AFP head 220. A gap 306 may be described as a condition in which the side edges of adjacent tows 256 in the same composite ply are spaced apart from each other over a section of their length.

An overlap 308 is a condition in which adjacent tows 256 in the same composite ply are on top of each other over a section of their length. Bridging (not shown) is a condition in which a tow 256 spans across a valley (e.g., a concave curvature) in the surface of the substrate 156, and may occur at an inside corner in the tool surface 154 of the layup tool 150. Puckers 310 may be described as an area of composite material 254 that is locally raised along the side edges of a tow 256, and may occur in tows 256 that are steered in an in-plane direction (not shown). Wrinkles 312 are similar to puckers 310, and may be described as out-of-plane distortions in the interior regions between the side edges of a tow 256. Low-quality tack 316 may be described as a low level of adhesion between the course 250 and the substrate 156. Although not shown, voids or porosity are a type of anomaly 300 that may occur in the green state layup 264 as a result of trapped air or volatiles.

Foreign object debris 318 may be described as any type of extraneous material that is unintended for incorporation into the green state layup 264, and may include small pieces of backing paper or film, plastic or metal particles, liquids such as water or oil, or any other type of extraneous material. Other examples of foreign object debris 318 include, but are not limited to, resin balls 320 and fuzz balls 322. Resin balls 320 may be described as small globules of resin that can accumulate on the components of the AFP head 220, eventually falling onto the substrate 156. A fuzz ball 322 may be described as loose bundles of fiber filaments that are formed along the side edges of the tows 256 while passing through the AFP head 220, and can fall onto the substrate 156, or onto the course 250 being applied to the substrate 156 by the AFP head 220.

Figure 25:
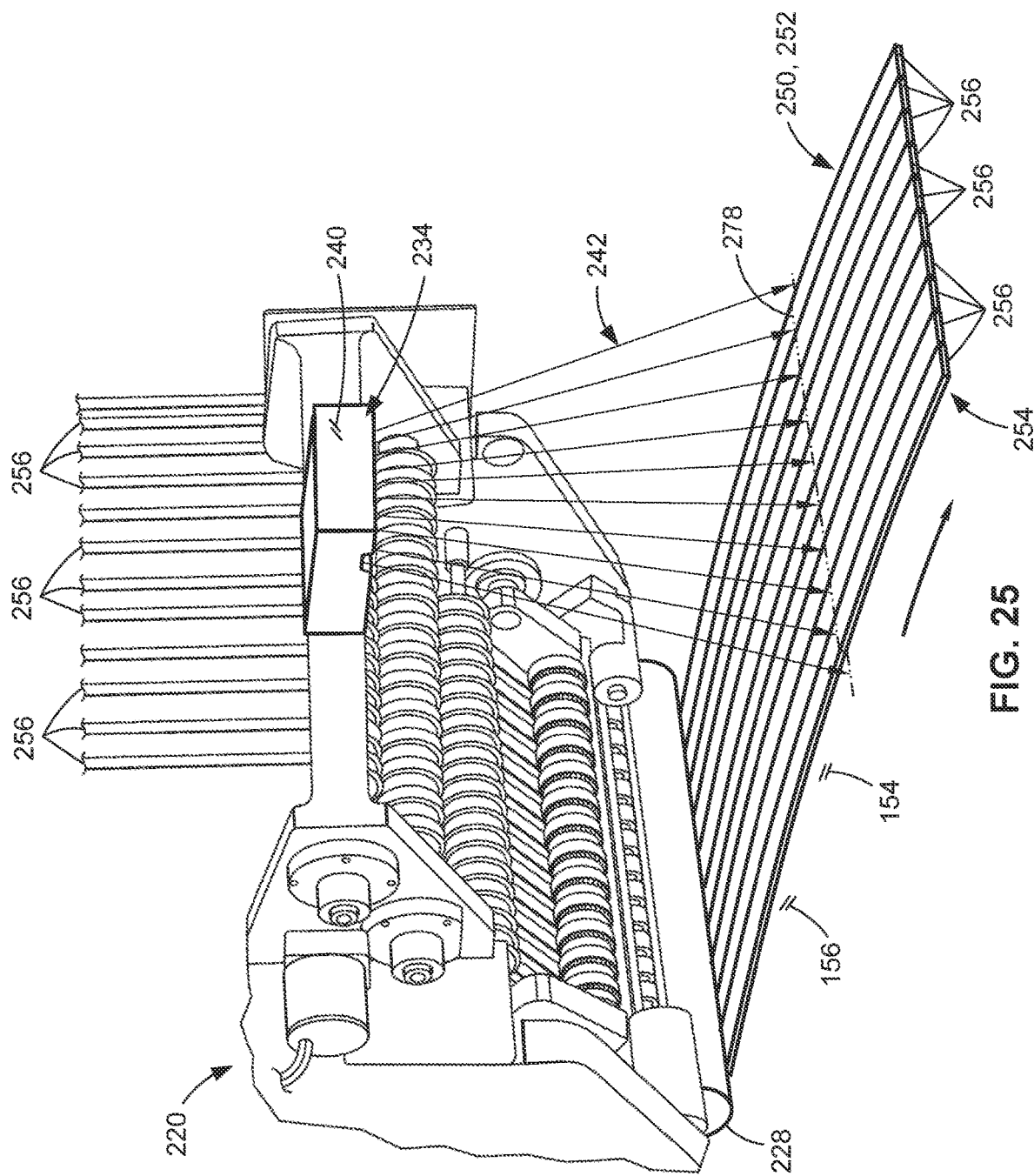
FIG. 25 is a perspective view of the AFP head showing the tow sensor configured as a profilometer for recording the surface profile of tows applied by the AFP head onto the tool surface.

Referring to FIG. 25, shown is an example of an AFP head 220 in which the tow sensor 234 is a profilometer 240. The profilometer 240 is configured to capture a series of layup profiles 278 (FIGS. 26-29) of the course 250 of layup material 252 immediately after application onto the substrate 156. The profilometer 240 may be a laser profilometer configured to emit one or more laser beams within a scanning plane 242. For example, the laser profilometer may emit a single laser beam configured to scan back and forth within a scanning angle of the scanning plane 242. Alternatively, a laser profilometer may emit multiple laser beams (not shown) within a scanning plane 242. The laser beams emitted by the laser profilometer impinge on the surface of the course 250 of layup material 252 being scanned, to result in a layup profile 278. Although shown and described as imaging devices 236 or profilometers 240, the tow sensors 234 may be provided in any one of a variety of alternative configurations capable of measuring the quality of the layup material 252 after application onto the substrate 156.

FIGS. 26-29 illustrate several examples of layup profiles 278 generated by the laser profilometer of FIG. 25. Each layup profile 278 represents a different anomaly type in the green state layup 264. For example, FIG. 26 shows a layup profile 278 representing a gap 306 between adjacent tows 256, as shown in the schematic illustration of the tows 256 located above the layup profile 278. FIG. 27 shows a layup profile 278 representing an overlap 308 of adjacent tows 256, as shown in the schematic illustration above the layup profile 278. FIG. 28 shows a layup profile 278 representing a missing tow 314, as shown in the tows 256 illustrated above the layup profile 278. FIG. 29 shows a layup profile 278 representing a fold 304 in a tow 256, and which is schematically illustrated in the tows 256 located above the layup profile 278.

The processor 362 (FIGS. 30 and 33) is configured to continuously or periodically receive the layup data 270 (e.g., layup images 272, layup profiles 278, etc.) from the tow sensors 234. In addition, the processor 362 receives the layup data 270 along with the capture location of the layup data 270. The capture location identifies the location where the layup data 270 was captured relative to the layup tool 150. For examples where the tow sensor 234 (FIG. 23) is an imaging device 236 (FIG. 23), each layup image 272 (FIG. 24) is provided to the processor 362 along with the capture location of the layup image 272. For examples where the tow sensor 234 (FIG. 25) is a profilometer 240 (FIG. 25), each layup profile 278 (FIGS. 26-29) is provided to the processor 362 along with the capture location of the layup profile 278.

The capture location of each layup image 272 may be based on the machine tool paths of the AFP head 220 from which the layup image 272 was generated. For example, the capture location of each layup image 272 may be determined by correlating its capture time to the machine tool path of the AFP head 220. The capture location of the layup data 270 may be provided in terms of Cartesian coordinates, cylindrical coordinates, or other reference systems. The layup data 270 provided to the processor 362 may optionally include a build identification (ID) number assigned to the green state layup 264. Although not shown, the manufacturing system 100 may include a separate laser locating system (e.g., mounted in the manufacturing cell) to validate the machine tool paths of each AFP head 220, via laser trackers (not shown) mounted on each AFP head 220.

Figure 33:
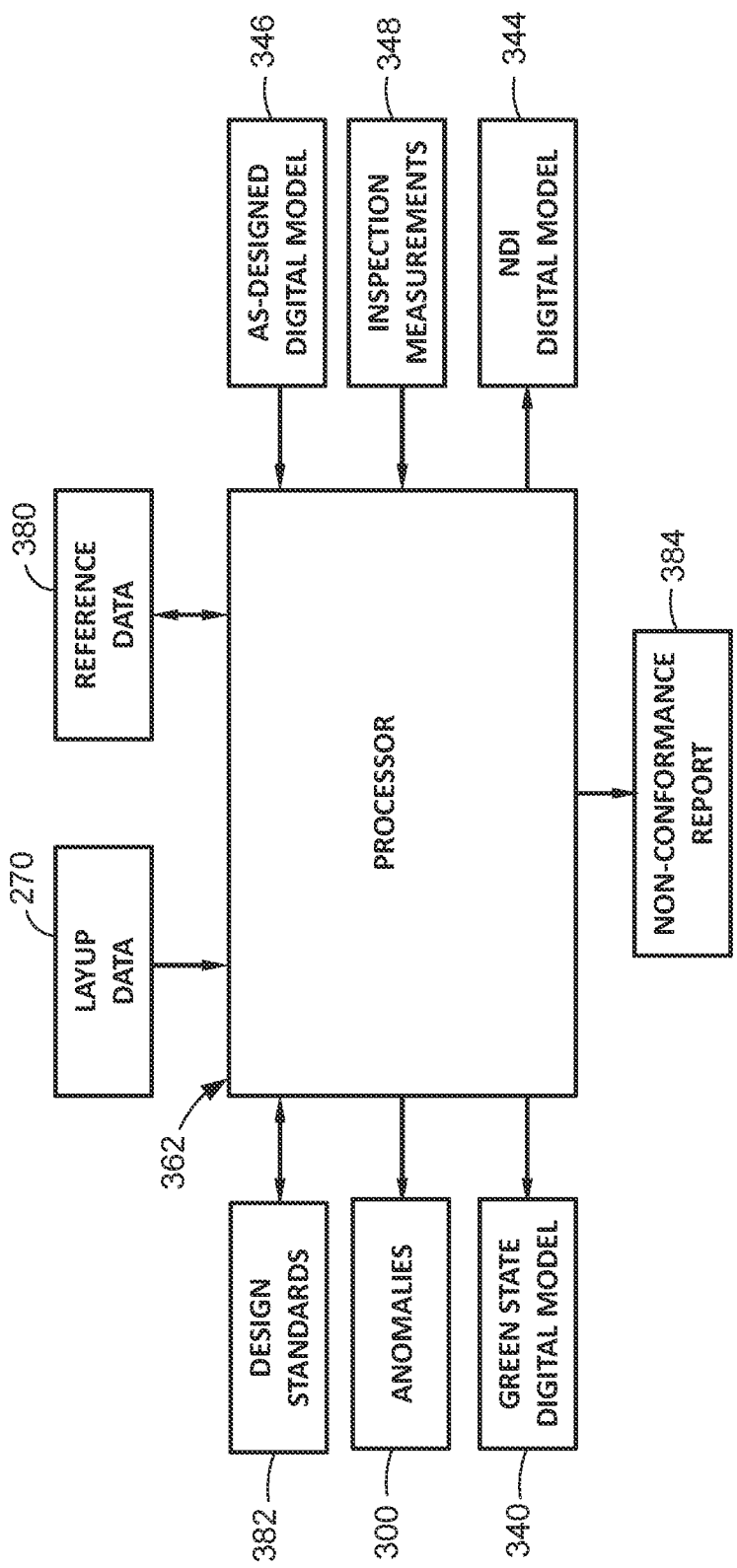
FIG. 33 is a block diagram of the processor showing examples of the input and the output for use in detecting and identifying anomalies in the green state layup.

Referring to FIG. 33, upon receiving the layup data 270, the processor 362 is configured to detect anomalies 300 in the green state layup 264 by comparing the layup data 270 to a database of reference data 380 containing examples of each type of anomaly 300 potentially occurring in a green state layup 264. For examples where the layup data 270 comprises layup images 272 generated by an imaging device 236, the processor 362 may detect anomalies 300 in the green state layup 264 by comparing each layup image 272 to a database of reference images containing examples of the different types of anomalies 300 that could potentially occur in the green state layup 264. For examples where the layup data 270 comprises layup profiles 278 generated by a profilometer 240, the processor 362 may detect anomalies 300 by comparing each layup profile 278 to a database of reference profiles. Prior to starting the process of fabricating the green state layup, a database of reference images and/or a database of reference profiles may be generated by analyzing a reference layup (not shown) laid up in a controlled environment, and wherein the reference layup includes intentionally-installed anomalies 300.

The processor 362 is configured to identify, based on the comparison, the anomaly type of each anomaly 300 (if any) present in the layup data 270, and determine the anomaly location of each anomaly 300 identified in the green state layup 264 based on the capture location of the layup data 270. For example, given a series of layup images 272 or series of layup profiles 278, the processor 362 is configured to determine the spatial location (e.g., on-part coordinates) of each anomaly 300 identified in each one of the layup images 272 or layup profiles 278. The spatial location of each anomaly 300 may be provided in terms of coordinates relative to a part origin 342 (FIG. 31) of the layup tool 150 or the green state layup 264. As described below, the spatial location includes the ply number in the ply stacking sequence, and may also include the tow identification number(s) 276 that each anomaly 300 is associated with, to enable quality assurance (QA) personnel to physically locate each anomaly 300 on the green state layup 264. As described below, the detection and identification of the anomalies 300 in the green state layup 264 allows for manual inspection and/or rework of the green state layup 264 prior to curing.

Figure 30:
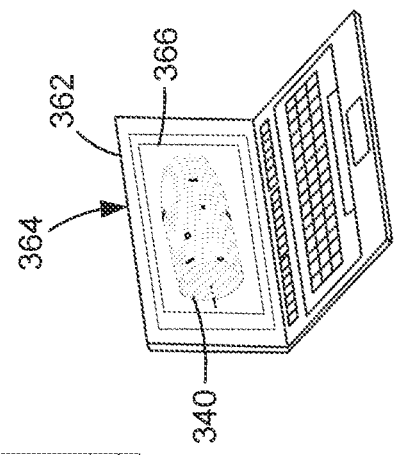
FIG. 30 shows an example of a computer containing a processor for detecting and identifying anomalies based on the layup data captured by the tow sensors during application of the layup material onto the layup tool via the AFP heads.
Figure 31:
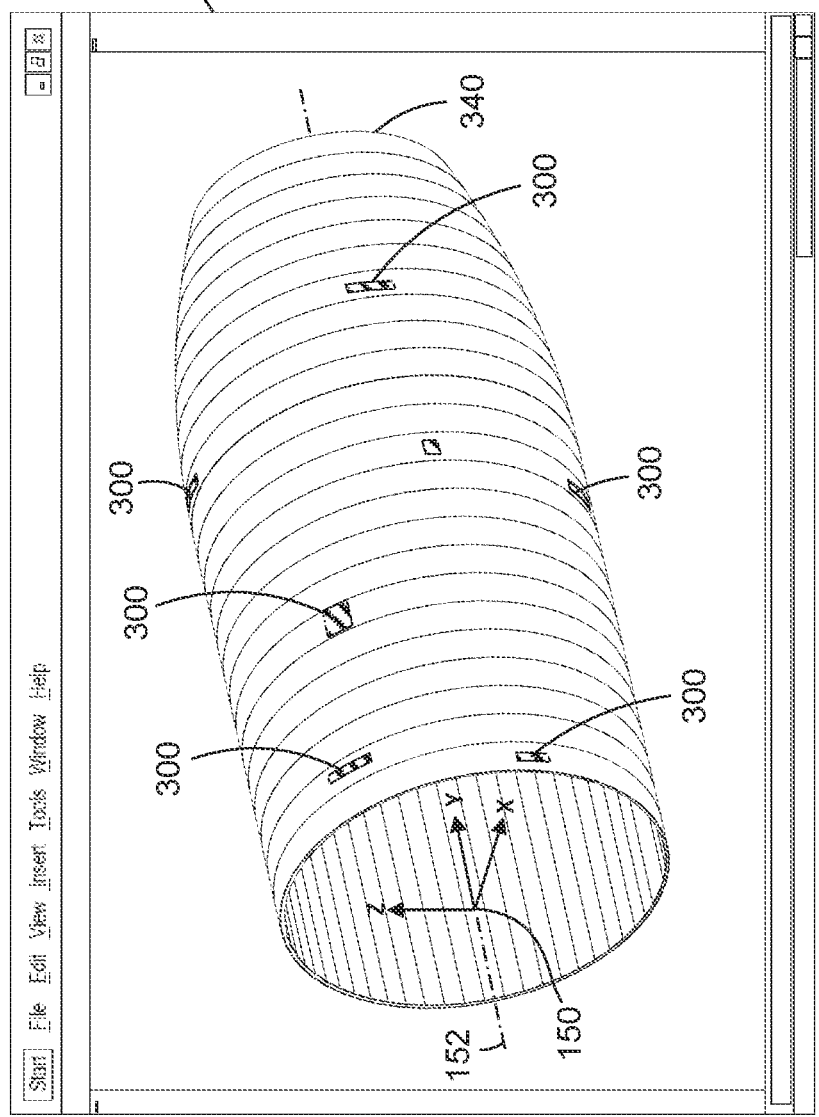
FIG. 31 shows a display screen of the computer of FIG. 30, illustrating a green state digital model generated by the processor, and containing the anomalies identified by the processor during analysis of the layup data from the tow sensors.
Figure 32:
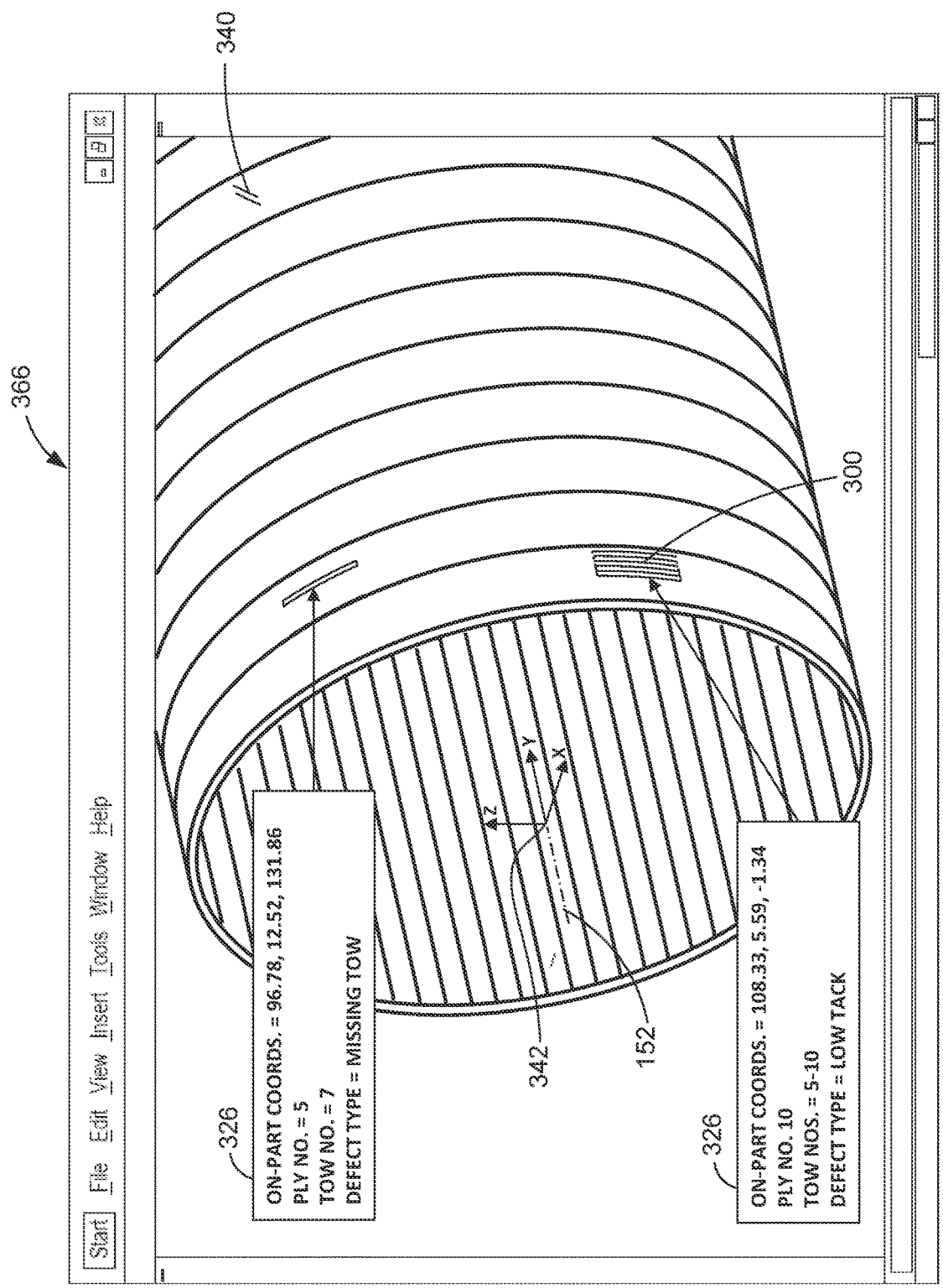
FIG. 32 is a magnified view of a portion of the green state digital model on the display screen of FIG. 31, and showing labels indicating the anomaly location and anomaly type of several anomalies detected in the green state layup.

Referring to FIGS. 30-32, the processor 362 is configured to build a green state digital model 340 (e.g., a three-dimensional model) of the green state layup 264 based on the layup data 270. An example of the green state digital model 340 is shown on the display screen 366 of the computer 364. In the example shown, the green state digital model 340 contains the anomalies 300 identified in the layup data 270. As shown in FIG. 32, the green state digital model 340 may be displayed along with labels 326 identifying the anomaly type and anomaly location of each anomaly 300 in the green state layup 264.

Referring to FIGS. 30-33, the processor 362 may determine whether the green state layup 264 meets engineering intent by analyzing each anomaly 300 in the green state digital model 340 to determine whether the anomaly 300 is acceptable or unacceptable. In one example, the processor 362 compares the characteristics of each anomaly 300 to a database of design standards 382 defining, for each anomaly type, minimum values and/or maximum values (e.g., tolerances) for each anomaly 300 characteristic. For example, the processor 362 may determine whether an anomaly 300 is acceptable by the determining whether the anomaly size is larger than a maximum size defined in the design standards 382. In another example, the processor 362 may determine whether an anomaly 300 is acceptable by analyzing the anomaly location relative to other features of the green state layup 264. For example, the processor 362 may determine whether an anomaly 300 is acceptable by determining the location of the anomaly 300 within the ply stack of the green state layup 264, or by determining the distance of the anomaly 300 from edges of the green state layup 264, or the distance of the anomaly 300 from cutouts to be later formed. As may be appreciated, the database of design standards 382 may specify minimum and/or maximum values for a wide variety of anomaly 300 characteristics. After analyzing each anomaly 300, the processor 362 may generate a non-conformance report 384 containing a list of all anomalies 300 in the green state layup 264, and indicating whether each anomaly 300 is acceptable or unacceptable. The non-conformance report 384 enables the physical inspection by QA personnel of the anomalies 300 in the green state layup 264 for disposition, such as possible rework of unacceptable anomalies 300.

A non-destructive inspection may be performed on the green state layup 264 after the layup process is complete, and while the green state layup 264 is supported on the layup tool 150. The non-destructive inspection may be performed using robotic devices (not shown) moving inspection probes (e.g., ultrasonic, infrared thermography—not shown) over the surfaces of the green state layup 264, to generate inspection measurements 348 (e.g., thickness measurements) of the green state layup 264.

Referring to FIG. 33, the processor 362 receives the inspection measurements 348 from the non-destructive inspection of the green state layup 264, and compares the inspection measurements 348 to values of a reference layup (not shown). The reference layup may be a digital representation of the green state layup 264 known to be defect free and having nominal thicknesses. Comparison of the inspection measurements 348 to the values of the reference layup facilitates detection of anomalies 300 in the green state layup 264, such as foreign object debris 318, voids, porosity, areas of low compaction, or missing tows. In addition, comparison of the inspection measurements 348 to the values the reference layup facilitates a determination as to whether the thickness measurements of the green state layup 264 are within thickness tolerances.

The processor 362 builds a non-destructive-inspection (NDI) digital model 344 (i.e., a three-dimensional model) of the green state layup 264 based on the inspection measurements 348. The NDI digital model 344 contains the anomalies 300 detected via the inspection measurements 348. The NDI digital model 344 is built to the thickness measurements of the non-destructive inspection. The processor 362 compares the green state digital model 340 to the NDI digital model 344 to validate the green state digital model 340, and generates the above-mentioned non-conformance report 384, which identifies discrepancies between the anomalies 300 in the green state digital model 340 and the anomalies 300 in the NDI digital model 344.

The non-conformance report 384 may include a listing of all of the anomalies 300, including an indication of the anomaly type and anomaly location of each anomaly 300. In addition, the non-conformance report 384 may identify whether each anomaly 300 in the green state digital model 340 is present in the NDI digital model 344, and whether each anomaly 300 in the NDI digital model 344 is present in the green state digital model 340. Anomalies 300 that are included with the green state digital model 340 but are not present in the NDI digital model 344 may prompt manual review of the layup data 270 (e.g., the layup images 272 or layup profiles 278) containing the missing anomaly 300 to determine if the anomaly 300 was mis-identified. Anomalies 300 that are included with the NDI digital model 344 but are not present in the green state digital model 340 may prompt manual review of the inspection measurements 348 to determine if the anomaly 300 was mis-identified. Advantageously, the above-described capabilities of the processor 362 eliminates time-intensive and costly inspection of each composite ply of the green state layup 264 by QA personnel, replacing it with an automated process that quickly detects anomalies 300, and identifies the anomaly location and anomaly type.

Referring to FIG. 33, in some examples, the processor 362 is configured to perform machine learning to improve the layup process for subsequently produced green state layups 264. In this regard, the processor 362 may continuously record process parameters associated with manufacturing each green state layup 264. One example of process parameters includes equipment parameters associated with the operation of the AFP heads 220. The equipment parameters may be automatically recorded for each AFP head 220 during the fabrication of each green state layup 264. Examples of equipment parameters include, but are not limited to, the location of tow adds and tow cuts, tow tension, heat output of heating devices 230 for heating the substrate 156, head velocity, tow temperature, substrate temperature, compaction force applied by the compaction roller 228 onto the layup material 252, position of the AFP heads 220 relative to each other, and other parameters. Examples of the process parameters also include material parameters associated with the layup material 252. The material parameters include, but are not limited to, the type of layup material 252 dispensed by the AFP heads 220, material lot number, material composition (e.g., resin composition), tack level of the composite material 254, out time of the composite material 254, and other parameters.

The processor 362 correlates the process parameters to the completion time required to fabricate the green state layup 264 (e.g., from start to finish of the layup process), and/or the process parameters are correlated to the occurrence of anomalies 300 in the green state layup 264, as detected by the processor 362. Based on the correlation, the processor 362 may adjust, in an iterative manner for each subsequently produced green state layup 264, one or more of the process parameters in a manner that results in a reduction of the completion time of subsequently produced green state layups 264, and/or which results in a reduction in the quantity and/or type of anomalies 300 in subsequently produced green state layups 264. In this manner, the processor 362 may improve the reliability of the AFP heads 220 in performing specific tasks, thereby improving the quality of the final product.

The processor 362 may also compare the green state digital model 340 to an as-designed digital model 346 of the green state layup 264, and validate the anomalies 300 identified in the green state digital model 340. In this regard, the processor 362 may confirm that the anomalies 300 detected by the processor 362 in the green state digital model 340 are actual anomalies 300, and are not part of the intended design of the green state layup 264, such as intentionally additional components (e.g., embedded sensors). The processor 362 may also validate the thickness measurements from non-destructive inspection of the green state layup 264, by confirming that the thickness measurements fall within the thickness tolerances defined for the green state layup 264.

As mentioned above, the processor 362 may adjust or optimize one or more process parameters in a manner to reduce the completion time or the number of anomalies 300 in the green state layup 264 currently being laid up, and/or in subsequently produced green state layups 264. Examples of the types of adjustments that may be performed include adjustment of any one or more of the above-mentioned equipment parameters, such as the location of tow adds and tow cuts, tow tension, heat output of the heating devices 230, head velocities of the AFP heads 220 at different locations of on the green state layup 264, tow temperature, substrate temperature, compaction force applied by the compaction rollers 228, the position of the AFP heads 220 relative to each other, and other equipment parameters. Examples of adjustments to material parameters include, but are not limited to, the type (e.g., composition) of layup material 252, the tack level of the composite material 254, the out time of the composite material 254, and other material parameters.

Still further examples of process parameter adjustments that may be performed to reduce completion time and/or anomalies 300 include reallocating or biasing the AFP heads 220 to perform certain tasks. Reallocation or biasing may be performed by an optimization algorithm that the processor 362 runs periodically (e.g., after each green state layup 264 is checked for anomalies 300), and which reallocates tasks based on the AFP heads 220 that complete the task in the shortest amount of time and with the fewest number of anomalies 300. Reallocation or reassignment of AFP heads 220 may also be performed in real time if there is less than optimal performance by one of the AFP heads 220. Reallocation of AFP heads 220 may be based a variety of factors including, but not limited to, the amount of layup material 252 remaining on each AFP head 220, the head location and/or head travel time of each AFP head 220 to a needed location on the green state layup 264, and other factors. The processor 362 may also schedule predictive maintenance for the AFP heads 220 to avoid unplanned down time due to head malfunctions, to thereby increase machine reliability. AFP heads 220 may be removed and replaced using the above-described head changing station 130.

Referring to FIG. 33, shown is a flowchart of operations included in a method 400 of manufacturing a barrel-shaped composite layup. The method 400 includes step 402 of moving (e.g., under control of a controller 360) a plurality of head manipulating mechanisms 200 respectively along a plurality of rails 118 arranged in parallel relation to each other around a barrel-shaped layup tool 150. As mentioned above, each rail 118 is oriented approximately parallel to the tool axis 152, and each head manipulating mechanism 200 is movable along a lengthwise direction of the rail 118 to which it is mounted. Each head manipulating mechanism 200 supports an AFP head 220.

The method 400 also includes step 404 of applying courses 250 of layup material 252 to the tool surface 154 or to previously applied layup material 252 when the layup tool 150 is stationary and during rotation about the tool axis 152, while moving the head manipulating mechanisms 200 along the rails 118, to thereby fabricate a green state layup 264 having a barrel shape. The AFP heads 220 simultaneously apply the layup material 252 in a coordinated manner, under control of the controller 360.

The method 400 additionally includes step 406 of maintaining, using the head manipulating mechanisms 200, the AFP heads 220 in circumferential relation to each other about the tool surface 154 while the AFP heads 220 apply courses 250 of layup material 252 over the layup tool 150. As described above, the total quantity of AFP heads 220 comprises the maximum number of AFP heads 220 that can be circumferentially arranged in longitudinal alignment with each other at a point of maximum circumference on the layup tool 150 without interfering with each other while applying the courses 250 of layup material 252 over the layup tool 150. The quantity of AFP heads 220 are maximized as a means to reduce the total number of passes required by the AFP heads 220 to fabricate the green state layup 264. In some examples, the step 406 of maintaining the AFP heads 220 in circumferentially spaced relation to each other comprises circumferentially spacing, using the head manipulating mechanisms 200, the AFP heads 220 apart from each other by approximately 360 degrees/n. In this manner, the AFP heads 220 are equiangularly spaced apart from each other.

As part of the process of laying up the green state layup 264, the method includes rotating, using each head manipulating mechanism 200, the corresponding AFP head 220 about an axis normal to the tool axis 152, for reversing the laydown direction of the AFP head 220. As part of the laydown process, the method also includes translating, using each head manipulating mechanism 200, the corresponding AFP head 220 along an axis normal to the tool axis 152, for alternatingly moving the AFP head 220 on and off the layup tool 150 (i.e., the tool surface 154 or previously-applied composite material 254) respectively at the start and end of each course 250.

As described above, the method further comprises temporarily adjusting, using the head manipulating mechanisms 200, the head velocity of one or more of the AFP heads 220 in a manner longitudinally staggering the AFP heads 220 during movement along a tapered section 158 of the layup tool 150, in a manner preventing interference between adjacent AFP heads 220. In one example, the adjustment of head velocity comprises temporarily decreasing or increasing the head velocity of alternating AFP heads 220, resulting in the longitudinal stagger of the AFP heads 220, as shown in the example of FIG. 16. In the example shown, every other AFP head 220 moves at a reduced head velocity, until the AFP heads 220 are longitudinally staggered 222 by an amount preventing interference between the AFP heads 220.

The method further includes maintaining, using the head manipulating mechanisms 200, the AFP heads 220 in longitudinal alignment with each other during movement along a lengthwise direction of the layup tool 150. FIGS. 15 and 18, described above, illustrate longitudinal alignment of the AFP heads 220. By keeping the head velocity of the AFP heads 220 the same, no additional time is added to the total amount of time required to fabricate the green state layup 264. As noted above, when applying 0-degree plies 258, the layup tool 150 is stationary (i.e., non-rotating) while the AFP heads 220 move longitudinally along the lengthwise direction of the layup tool 150. When applying 45-degree plies 260, the layup tool 150 rotates about the tool axis 152 while the AFP heads 220 move longitudinally along the lengthwise direction of the layup tool 150. When applying 90-degree plies 262, the layup tool 150 rotates about the tool axis 152 while the AFP heads 220 are longitudinally stationary when applying each course 250 of layup material 252.

The process of applying courses 250 of layup material 252 to the layup tool 150 includes dispensing, using the AFP heads 220, the layup material 252 as side-by-side tows 256 of composite material 254. As mentioned above, each AFP head 220 is typically configured to dispense bands of side-by-side tows 256. For example, each AFP head 220 may dispense an 8-inch-wide band of ½-inch tows 256. The width of the bands may be increased for large diameter layup tools 150. The width of the individual tows 256 may be decreased for high-contour layup tools 150.

During application of the layup material 252, the method includes moving, using a head manipulating mechanism 200, the corresponding AFP head 220 about multiple axes to maintain the AFP head 220 generally perpendicular to the contours of the tool surface 154. Toward this end, the method includes rotating each AFP head 220 about at least one of 6 axes (e.g., 6 rotary axes 210) to continuously maintain perpendicularity of the AFP head 220 when applying courses 250 of layup material 252 to the tool surface 154. In addition, the AFP heads 220 are rotated about an axis normal to the tool axis 152 when reversing the laydown direction of the AFP head 220. The AFP heads 220 are translated along the axis normal to the tool axis 152 when moving the AFP heads 220 on and off the layup tool 150 respectively at the start and end of each course 250.

Referring to FIGS. 11-14 described above, the method further includes exchanging, using a head manipulating mechanism 200, an AFP head 220 currently mounted on the head manipulating mechanism 200, with a replacement head supported on a head stand 132 of a head changing station 130 located at one of opposing ends of the layup tool 150. As described above, each AFP includes a quick-release mechanism (not shown) for releasing an AFP head 220 (e.g., that is malfunctioning, or which has expended material rolls 226) onto an unoccupied head stand 132, and then engaging a replacement AFP head 134 supported by another head stand 132.

Referring to FIGS. 22-32 described above, some examples of the method include capturing, using one or more tow sensors 234 on each AFP head 220, layup data 270 regarding the course 250 of layup material 252 immediately after application by the AFP head 220. As mentioned above, each tow sensor 234 may be an imaging device 236, such as an infrared camera 238 or a visible light camera, configured to capture a series of layup images 272 of each course 250 during application. Alternatively or additionally, the tow sensor 234 may be a profilometer 240 configured to record a series of layup profiles 278 of each course 250 during application to the layup tool 150.

The method includes continuously or periodically receiving, at the processor 362, the layup data 270 (e.g., layup images 272 and/or layup profiles 278), along with the capture location of the layup data 270. In addition, the method includes detecting, using the processor 362, anomalies 300 in the green state layup 264 by comparing the layup data 270 to reference data 380 collectively containing examples of each type of anomaly 300 potentially occurring in the green state layup 264. As mentioned above, the comparison may include comparing each layup image 272 to a database of reference images and/or comparing each layup profile 278 to a database of reference profiles.

The method additionally includes identifying, using the processor 362, based on the comparison, the anomaly type of each anomaly 300 present in the layup data 270, and determining, based on the capture location of the layup data 270, the anomaly location of each anomaly 300 in the green state layup 264. The anomaly location of each anomaly 300 in the green state layup 264 may include the ply number and the tow identification number(s) 276 that each anomaly 300 is associated with. As described above, the detection and identification of the anomalies 300 in the green state layup 264 allows for manual inspection and/or rework of the green state layup 264.

Referring to FIGS. 30-32, the method additionally includes building, using the processor 362, a green state digital model 340 of the green state layup 264. As described above, the green state digital model 340 contains the anomalies 300 identified in the layup data 270. As shown in FIG. 32, the green state digital model 340 may include labels 326 identifying the anomaly type and the anomaly location of each anomaly 300.

In some examples, the method may include determining whether each anomaly 300 in the green state digital model 340 is acceptable or unacceptable by comparing characteristics of each anomaly 300 to a database of design standards 382 defining, for each anomaly type, minimum values and/or maximum values (e.g., tolerances) for each anomaly 300 characteristic, as described above. The method may include listing the anomalies 300 in a non-conformance report 384, to facilitate physically locating and inspecting the anomalies 300 on the green state layup 264.

To validate the green state model, the method includes performing a non-destructive inspection of the green state layup 264 after the layup process is complete. Although not shown, the non-destructive inspection may be performed using via an NDI system (not shown), and which may involve moving one or more inspection probes over the surfaces of the green state layup 264 using robotic devices. As mentioned above, inspection probes may be provided in any one of a variety of modalities including, but not limited to, ultrasonic inspection or infrared thermography. The non-destructive inspection of the green state layup 264 results in inspection measurements 348 such as thickness measurements of the green state layup 264.

The method includes receiving the inspection measurements 348 from the non-destructive inspection of the green state layup 264, and comparing the inspection measurements 348 (e.g., thickness measurements) to values of a reference layup, which may be a digital model of the green state layup 264 known to be defect free and having nominal thicknesses. Comparison of the inspection measurements 348 with the reference layup reveals anomalies 300 in the green state layup 264, such as FOD, missing tows, or other defects. In addition, the comparison may identify areas of the green state layup 264 for the thickness measurements fall outside of thickness tolerances defined for the green state layup 264.

Based upon the comparison, the method includes building a non-destructive-inspection (NDI) digital model 344 of the green state layup 264, wherein the NDI digital model 344 contains the anomalies 300 detected via the inspection measurements 348. The method further includes comparing the green state digital model 340 to the NDI digital model 344 to validate the green state digital model 340, and identify any discrepancies between the green state digital model 340 and the NDI digital model 344. The method includes generating a non-conformance report 384 listing all of the anomalies 300, including a listing of anomaly type and anomaly location, and identifying discrepancies in anomalies 300 in the green state digital model 340 relative to anomalies 300 in the NDI digital model 344, to thereby validate the green state digital model 340, as described above.

In some example, the method may further include recording process parameters associated with the fabrication of the green state layup 264. As described above, such process parameters may include equipment parameters associated with the AFP heads 220, and/or material parameters associated with the layup material 252. The method includes correlating the process parameters to the completion time required to produce the green state layup 264 from start to finish of the layup process. In addition, the method includes correlating the process parameters to the occurrence of anomalies 300 in the green state layup 264 as detected by the processor 362. The method additionally includes adjusting, in an iterative manner for each subsequently produced green state layup 264, one or more of the process parameters in a manner to result in a reduction in the completion time of subsequently produced green state layups 264, and/or a reduction (e.g., prevention) in anomalies 300 and subsequently produced green state layups 264.

Referring to FIG. 34, the method may further include comparing the green state digital model 340 to an as-designed digital model 346 of the green state layup 264, and validating the anomalies 300 identified in the green state digital model 340, by confirming that the anomalies 300 detected by the processor 362 in the green state digital model 340 are, in fact, anomalies 300, and are not part of the intended design of the green state layup 264. In addition, the comparison of the green state digital model 340 to the as-designed digital model 346 validates the thickness measurements from the non-destructive inspection of the green state layup 264. In this regard, the comparison confirms that the thickness measurements of the green state layup 264 fall within pre-defined thickness tolerances.

The method may additionally include using the processor 362 to adjust or optimize the process parameters in a manner to minimize the completion time and reduce the number of anomalies 300 in subsequently produced green state layups 264. Adjustment of the process parameters may include adjusting equipment parameters, adjusting material parameters, reallocating the AFP heads 220, and/or scheduling predictive maintenance for the AFP heads 220. Adjusting the equipment parameters may include adjusting: the location of tow adds and tow cuts, the tow tension, the heat output of heating devices 230, the head velocities of the AFP head 220, the tow temperature, the substrate temperature, the compaction force applied by the compaction roller 228 onto the layup material 252, the positions of the AFP heads 220 relative to each other, and/or other equipment parameters. Adjusting the material parameters may include selecting a layup material 252 having a different material composition (e.g., resin composition), selecting a composite material 254 having a different tack level, changing the maximum amount of out time of the composite material 254, or any one a variety of other adjustments.

The processor 362 may reallocate the AFP heads 220 to lay up different areas of subsequently produced green state layups 264, in a manner reducing or preventing a repeat of one or more of the anomalies 300 in one or more previously produced green state layups 264. As described above, the processor 362 may also schedule predictive maintenance for the AFP heads 220 to avoid unplanned down time due to head malfunctions, material depletions, or other factors. Reallocation of the AFP heads 220 may be based on the amount of layup material 252 remaining on each AFP head 220, the reliability of each head to perform a specific task without anomalies 300, the head location and/or head travel time of each AFP head 220 to a needed location on the green state layup 264, and other factors.

The disclosure includes example embodiments in accordance with the following clauses:

Clause 1. A manufacturing system 100, comprising:
a plurality of rails 118 arranged in parallel relation to each other around a barrel-shaped layup tool 150, and each rail 118 is oriented approximately parallel to a tool axis 152 of the layup tool;
a plurality of head manipulating mechanisms 200, each coupled to a dedicated one of the rails 118, and each head manipulating mechanism 200 is movable along a lengthwise direction of a corresponding rail; and
a plurality of automated fiber placement (AFP) heads 220, each coupled to a dedicated one of the head manipulating mechanisms 200;
wherein the head manipulating mechanisms 200 are configured to position the AFP heads 220 in circumferential relation to each other about a tool surface 154 of the layup tool 150, a total quantity of AFP heads 220 comprises the maximum number of AFP heads 220 that can be circumferentially arranged in longitudinal alignment with each other at a point of maximum circumference on the layup tool 150 without interfering with each other while the AFP heads 220 apply courses 250 of layup material 252 to the tool surface 154 or to previously applied layup material 252 when the layup tool 150 is stationary and during rotation of the layup tool 150 about the tool axis 152, to thereby fabricate a green state layup 264 having a barrel shape.

Clause 2. The manufacturing system 100 of Clause 1, wherein:
the head manipulating mechanisms 200 are configured to adjust a head velocity of at least some of the AFP heads 220 in a manner to longitudinally stagger the AFP heads 220 relative to each other to avoid interference between the AFP heads 220 during movement along a tapered section 158 of the layup tool 150.

Clause 3. The manufacturing system 100 of Clause 1 or 2, wherein:
the head manipulating mechanisms 200 are configured to maintain the plurality of AFP heads 220 in longitudinal alignment with each other during movement along a lengthwise direction of the layup tool 150.

Clause 4. The manufacturing system 100 of any of Clauses 1-3, wherein:
the plurality of AFP heads 220 comprises n quantity of AFP heads 220; and
the plurality of head manipulating mechanisms 200 are configured to circumferentially space the plurality of AFP heads 220 apart from each other by approximately 360 degrees/n.

Clause 5. The manufacturing system 100 of any of Clauses 1-4, wherein:
each head manipulating mechanism 200 is a 6-axis arm, enabling movement of each AFP head 220 about 6 axes.

Clause 6. The manufacturing system 100 of any of Clauses 1-5, further comprising:
a head changing station located at one of opposing ends of the layup tool 150, the head changing station supporting one or more replacement AFP heads 134, and each replacement AFP head 134 is supported on a head stand; and
each head manipulating mechanism 200 is configured to release an AFP head 220 onto an unoccupied head stand 132, and engage a replacement AFP head 134 supported by another head stand 132.

Clause 7. The manufacturing system 100 of any of Clauses 1-6, further comprising:
a plurality of tow sensors 234 respectively mounted on the plurality of AFP heads 220, the tow sensor 234 of each AFP head 220 configured to capture layup data 270 regarding the layup material 252 immediately after application by the AFP head;
a processor 362 configured to:
receive the layup data 270, along with a capture location of the layup data 270;
detect anomalies 300 in the green state layup 264 by comparing the layup data 270 to reference data 380 containing examples of each type of anomaly 300 potentially occurring in the green state layup; and
identify, based on the comparison, an anomaly type of each anomaly 300 present in the layup data 270, and determine, based on the capture location of the layup data 270, a location of each anomaly 300 in the green state layup 264, to enable physically locating each anomaly 300 for potential rework.

Clause 8. The manufacturing system 100 of Clause 7, wherein the processor 362 is configured to:
build a green state digital model 340 of the green state layup 264, the green state digital model 340 containing the anomalies 300 identified in the layup data 270; and
determine whether each anomaly 300 in the green state digital model 340 is acceptable or unacceptable, by comparing characteristics of each anomaly 300 to a database of design standards 382 defining, for each anomaly type, minimum values and/or maximum values for each anomaly 300 characteristic.

Clause 9. The manufacturing system 100 of Clause 8, wherein the processor 362 is configured to:
receive inspection measurements 348 resulting from non-destructive inspection of the green state layup 264, and compare the inspection measurements 348 to values of a reference layup, to thereby detect anomalies 300 in the green state layup;
build a non-destructive-inspection (NDI) digital model 344 of the green state layup 264, the NDI digital model 344 containing the anomalies 300 detected via the inspection measurements 348; and
compare the green state digital model 340 to the NDI digital model 344 to validate the green state digital model 340, and identify any discrepancies between the green state digital model 340 and the NDI digital model 344.

Clause 10. The manufacturing system 100 of Clause 9, wherein the processor 362 is configured to:
record one or more process parameters associated with manufacturing the green state layup 264, the process parameters comprising at least one of the following:
equipment parameters associated with the AFP heads 220;
material parameters associated with the layup material 252 dispensed by the AFP heads 220;
correlate the process parameters to at least one of the following:
completion time required to produce the green state layup;
anomalies 300 in the green state layup;
adjust, for each subsequently produced green state layup 264, one or more process parameters in a manner to result in at least one of the following:
a reduction in the completion time; and
a reduction in the quantity of anomalies 300.

Clause 11. A composite layup system, comprising:
a layup tool 150 having a barrel shape, a tool surface 154, and a tool axis 152 about which the layup tool 150 is rotatable;
a plurality of rails 118 arranged in parallel relation to each other around the layup tool 150, and each is rail 118 oriented approximately parallel to the tool axis 152;
a plurality of head manipulating mechanisms 200, each coupled to a dedicated one of the rails 118, and each head manipulating mechanism 200 is movable along a lengthwise direction of a corresponding rail; and
a plurality of automated fiber placement (AFP) heads 220, each coupled to a dedicated one of the head manipulating mechanisms 200;
wherein the head manipulating mechanisms 200 are configured to position the AFP heads 220 in circumferential relation to each other about a tool surface 154 of the layup tool 150, a total quantity of AFP heads 220 comprises the maximum number of AFP heads 220 that can be circumferentially arranged in longitudinal alignment with each other at a point of maximum circumference on the layup tool 150 without interfering with each other while the plurality of AFP heads 220 apply courses 250 of layup material 252 to the tool surface 154 or to previously applied layup material 252 when the layup tool 150 is stationary and during rotation of the layup tool 150 about the tool axis 152, to thereby fabricate a green state layup 264 having a barrel shape.

Clause 12. The composite layup system of Clause 11, wherein:
the layup tool 150 is shaped and configured for fabricating a fuselage barrel section 390.

Clause 13. A method of manufacturing a barrel-shaped composite layup, comprising:
moving a plurality of head manipulating mechanisms 200 respectively along a plurality of rails 118 arranged in parallel relation around a barrel-shaped layup tool 150 having a tool surface 154 and a tool axis 152, each rail 118 is oriented approximately parallel to the tool axis 152, and each head manipulating mechanism 200 supports an automated fiber placement (AFP) head;
applying, using the AFP heads 220, courses 250 of layup material 252 to the tool surface 154 or to previously applied layup material 252 when the layup tool 150 is stationary and during rotation about the tool axis 152, to thereby fabricate a green state layup; and
maintaining, using the head manipulating mechanisms 200, the AFP heads 220 in circumferential relation to each other about the tool surface 154 while the AFP heads 220 apply courses 250 of layup material 252 over the layup tool 150, a total quantity of AFP heads 220 comprises the maximum number of AFP heads 220 that can be circumferentially arranged in longitudinal alignment with each other at a point of maximum circumference on the layup tool 150 without interfering with each other while applying the courses 250 of layup material 252 over the layup tool 150.

Clause 14. The method of Clause 13, further comprising:
adjusting, using the head manipulating mechanisms 200, a head velocity of one or more of the AFP heads 220 in a manner longitudinally staggering the AFP heads 220 during movement along a tapered section 158 of the layup tool 150, in a manner preventing interference between the AFP heads 220.

Clause 15. The method of Clause 13 or 14, further comprising:
maintaining, using the head manipulating mechanisms 200, the AFP heads 220 in longitudinal alignment with each other during movement along a lengthwise direction of the layup tool 150.

Clause 16. The method of any of Clauses 13-15, further comprising:
exchanging, using at least one head manipulating mechanism 200, an AFP head 220 currently mounted on the head manipulating mechanism 200, with a replacement AFP head 134 supported on a head stand 132 of a head changing station located at one of opposing ends of the layup tool 150.

Clause 17. The method of any of Clauses 13-16, further comprising:
capturing, using a tow sensor 234 mounted on each one of the AFP heads 220, layup data 270 of the layup material 252 immediately after application by the AFP head;
receiving, at a processor 362, the layup data 270, along with a capture location of the layup data 270;
detecting, using the processor 362, anomalies 300 in the green state layup 264 by comparing the layup data 270 to reference data 380 containing examples of each type of anomaly 300 potentially occurring in the green state layup; and
identifying, using the processor 362 based on the comparison, an anomaly type of each anomaly 300 present in the layup data 270, and determining, based on the capture location of the layup data 270, a location of each anomaly 300 on the green state layup 264, to enable physically locating each anomaly 300 for potential rework.

Clause 18. The method of Clause 17, further comprising performing the following using the processor 362:
building a green state digital model 340 of the green state layup 264, the green state digital model 340 containing the anomalies 300 identified in the layup data 270; and
determining whether each anomaly 300 in the green state digital model 340 is acceptable or unacceptable by comparing characteristics of each anomaly 300 to a database of design standards 382 defining, for each anomaly type, minimum values and/or maximum values for each anomaly 300 characteristic.

Clause 19. The method of Clause 18, further comprising performing the following using the processor 362:
receiving inspection measurements 348 from non-destructive inspection of the green state layup 264 and comparing the inspection measurements 348 to values of a reference layup known to be defect free, to thereby detect anomalies 300 in the green state layup;
building a non-destructive-inspection (NDI) digital model 344 of the green state layup 264, the NDI digital model 344 containing the anomalies 300 detected via the inspection measurements 348; and
comparing the green state digital model 340 to the NDI digital model 344 to validate the green state digital model 340, and identify any discrepancies between the green state digital model 340 and the NDI digital model 344.

Clause 20. The method of Clause 19, further comprising performing the following using the processor 362:
recording one or more process parameters associated with manufacturing the green state layup 264, the process parameters comprising at least one of the following:
equipment parameters associated with the AFP heads 220;
material parameters associated with the layup material 252 dispensed by the AFP heads 220;
correlating the process parameters to at least one of the following:
completion time required to produce the green state layup;
anomalies 300 in the green state layup;
adjusting in an iterative manner for each subsequently produced green state layup 264, one or more process parameters in a manner to result in at least one of the following:
a reduction in the completion time; and
a reduction in the quantity and/or type of anomalies 300.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A manufacturing system, comprising:
at least three rails arranged in non-planar parallel relation to each other around a barrel-shaped layup tool, and each rail is oriented approximately parallel to a tool axis of the layup tool;
at least three head manipulating mechanisms, each coupled to a dedicated one of the rails, and each head manipulating mechanism is movable along a lengthwise direction of a corresponding rail; and
at least three automated fiber placement (AFP) heads, each coupled to a dedicated one of the head manipulating mechanisms;
wherein the head manipulating mechanisms are configured to position the AFP heads in circumferential relation to each other about a tool surface of the layup tool, a total quantity of AFP heads comprises a maximum number of AFP heads that can be circumferentially arranged in longitudinal alignment with each other at a point of maximum circumference on the layup tool without interfering with each other while the at least three AFP heads apply courses of layup material to the tool surface or to previously applied layup material when the layup tool is stationary and during rotation of the layup tool about the tool axis, to thereby fabricate a green state layup having a barrel shape.

2. The manufacturing system of claim 1, wherein:
the head manipulating mechanisms are robotic devices each having a base; and
the robotic devices are configured to adjust a head velocity of at least some of the AFP heads by adjusting the velocity of the bases along the rails in a manner to longitudinally stagger the AFP heads relative to each other to avoid interference between the AFP heads during movement along a tapered section of the layup tool.

3. The manufacturing system of claim 1, wherein:
the head manipulating mechanisms are configured to maintain the at least three AFP heads in longitudinal alignment with each other during movement along a lengthwise direction of the layup tool.

4. The manufacturing system of claim 1, wherein:
the at least three AFP heads comprises n quantity of AFP heads; and
the at least three head manipulating mechanisms are configured to circumferentially space the at least three AFP heads apart from each other by approximately 360 degrees/n.

5. The manufacturing system of claim 1, wherein:
each head manipulating mechanism is a 6-axis arm, enabling movement of each AFP head about 6 axes.

6. The manufacturing system of claim 1, further comprising:
a head changing station located at one of opposing ends of the layup tool, the head changing station supporting one or more replacement AFP heads, and each replacement AFP head is supported on a head stand; and
each head manipulating mechanism is configured to release an AFP head onto an unoccupied head stand, and engage a replacement AFP head supported by another head stand.

7. The manufacturing system of claim 1, further comprising:
at least three tow sensors respectively mounted on the at least three AFP heads, the tow sensor of each AFP head configured to capture layup data regarding the layup material immediately after application by the AFP head;
a processor configured to:
receive the layup data, along with a capture location of the layup data;
detect anomalies in the green state layup by comparing the layup data to reference data containing examples of each type of anomaly potentially occurring in the green state layup; and
identify, based on the comparison, an anomaly type of each anomaly present in the layup data, and determine, based on the capture location of the layup data, a location of each anomaly in the green state layup, to enable physically locating each anomaly for potential rework.

8. The manufacturing system of claim 7, wherein the processor is configured to:
build a green state digital model of the green state layup, the green state digital model containing the anomalies identified in the layup data; and
determine whether each anomaly in the green state digital model is acceptable or unacceptable, by comparing characteristics of each anomaly to a database of design standards defining, for each anomaly type, minimum values and/or maximum values for each anomaly characteristic.

9. The manufacturing system of claim 8, wherein the processor is configured to:
receive inspection measurements resulting from non-destructive inspection of the green state layup, and compare the inspection measurements to values of a reference layup, to thereby detect anomalies in the green state layup;
build a non-destructive-inspection (NDI) digital model of the green state layup, the NDI digital model containing the anomalies detected via the inspection measurements; and
compare the green state digital model to the NDI digital model to validate the green state digital model, and identify any discrepancies between the green state digital model and the NDI digital model.

10. The manufacturing system of claim 9, wherein the processor is configured to:
record one or more process parameters associated with manufacturing the green state layup, the process parameters comprising at least one of the following:
equipment parameters associated with the AFP heads;
material parameters associated with the layup material dispensed by the AFP heads;
correlate the process parameters to at least one of the following:
completion time required to produce the green state layup;
anomalies in the green state layup;
adjust, for each subsequently produced green state layup, one or more process parameters in a manner to result in at least one of the following:
a reduction in the completion time; and
a reduction in the quantity of anomalies.

11. A composite layup system, comprising:
a layup tool having a barrel shape, a tool surface, and a tool axis about which the layup tool is rotatable;
at least three rails arranged in non-planar parallel relation to each other around the layup tool, and each is rail oriented approximately parallel to the tool axis;

at least three head manipulating mechanisms, each coupled to a dedicated one of the rails, and each head manipulating mechanism is movable along a lengthwise direction of a corresponding rail; and at least three automated fiber placement (AFP) heads, each coupled to a dedicated one of the head manipulating mechanisms;

wherein the head manipulating mechanisms are configured to position the AFP heads in circumferential relation to each other about the tool surface of the layup tool, a total quantity of AFP heads comprises a maximum number of AFP heads that can be circumferentially arranged in longitudinal alignment with each other at a point of maximum circumference on the layup tool without interfering with each other while the at least three AFP heads apply courses of layup material to the tool surface or to previously applied layup material when the layup tool is stationary and during rotation of the layup tool about the tool axis, to thereby fabricate a green state layup having a barrel shape.

12. The composite layup system of claim 11, wherein:
the layup tool is shaped and configured for fabricating a fuselage barrel section.

13. A method of manufacturing a barrel-shaped composite layup, comprising:
moving at least three head manipulating mechanisms respectively along at least three rails arranged in non-planar parallel relation around a barrel-shaped layup tool having a tool surface and a tool axis, each rail is oriented approximately parallel to the tool axis, and each head manipulating mechanism supports an automated fiber placement (AFP) head;

applying, using the AFP heads, courses of layup material to the tool surface or to previously applied layup material when the layup tool is stationary and during rotation about the tool axis, to thereby fabricate a green state layup; and maintaining, using the head manipulating mechanisms, the AFP heads in circumferential relation to each other about the tool surface while the AFP heads apply courses of layup material over the layup tool, a total quantity of AFP heads comprises a maximum number of AFP heads that can be circumferentially arranged in longitudinal alignment with each other at a point of maximum circumference on the layup tool without interfering with each other while applying the courses of layup material over the layup tool.

14. The method of claim 13, further comprising:
adjusting, using the head manipulating mechanisms, a head velocity of one or more of the AFP heads in a manner longitudinally staggering the AFP heads during movement along a tapered section of the layup tool, in a manner preventing interference between the AFP heads.

15. The method of claim 13, further comprising:
maintaining, using the head manipulating mechanisms, the AFP heads in longitudinal alignment with each other during movement along a lengthwise direction of the layup tool.

16. The method of claim 13, further comprising:
exchanging, using at least one head manipulating mechanism, an AFP head currently mounted on the head manipulating mechanism, with a replacement AFP head supported on a head stand of a head changing station located at one of opposing ends of the layup tool.

17. The method of claim 13, further comprising:
capturing, using a tow sensor mounted on each one of the AFP heads, layup data of the layup material immediately after application by the AFP head;

receiving, at a processor, the layup data, along with a capture location of the layup data;

detecting, using the processor, anomalies in the green state layup by comparing the layup data to reference data containing examples of each type of anomaly potentially occurring in the green state layup; and identifying, using the processor based on the comparison, an anomaly type of each anomaly present in the layup data, and determining, based on the capture location of the layup data, a location of each anomaly on the green state layup, to enable physically locating each anomaly for potential rework.

18. The method of claim 17, further comprising performing the following using the processor:
building a green state digital model of the green state layup, the green state digital model containing the anomalies identified in the layup data; and determining whether each anomaly in the green state digital model is acceptable or unacceptable by comparing characteristics of each anomaly to a database of design standards defining, for each anomaly type, minimum values and/or maximum values for each anomaly characteristic.

19. The method of claim 18, further comprising performing the following using the processor:
receiving inspection measurements from non-destructive inspection of the green state layup and comparing the inspection measurements to values of a reference layup known to be defect free, to thereby detect anomalies in the green state layup;

building a non-destructive-inspection (NDI) digital model of the green state layup, the NDI digital model containing the anomalies detected via the inspection measurements; and comparing the green state digital model to the NDI digital model to validate the green state digital model, and identify any discrepancies between the green state digital model and the NDI digital model.

20. The method of claim 19, further comprising performing the following using the processor:
recording one or more process parameters associated with manufacturing the green state layup, the process parameters comprising at least one of the following:
equipment parameters associated with the AFP heads;
material parameters associated with the layup material dispensed by the AFP heads;

correlating the process parameters to at least one of the following:
completion time required to produce the green state layup;
anomalies in the green state layup;

adjusting in an iterative manner for each subsequently produced green state layup, one or more process parameters in a manner to result in at least one of the following:
a reduction in the completion time; and
a reduction in the quantity and/or type of anomalies.

* * * * *